United States Patent

Hammer et al.

[11] Patent Number: 6,031,965
[45] Date of Patent: Feb. 29, 2000

[54] SEPARATELY EXCITED DC MOTOR WITH BOOST AND DE-BOOST CONTROL

[75] Inventors: Joseph K. Hammer, St. Marys; David B. Stang, Troy; John R. Harman, Versailles; Christopher M. Killian, New Bremen, all of Ohio; Robert Lankin, Newton, Canada

[73] Assignee: Solaria Research Enterprise, Ltd., Waterloo, Canada

[21] Appl. No.: 09/162,268

[22] Filed: Sep. 29, 1998

Related U.S. Application Data

[63] Continuation-in-part of application No. 08/889,227, Jul. 8, 1997, Pat. No. 5,878,189
[60] Provisional application No. 60/060,430, Sep. 30, 1997, and provisional application No. 60/060,460, Sep. 30, 1997.
[51] Int. Cl.[7] ........................................................ H02P 5/178
[52] U.S. Cl. ........................... 388/801; 388/907.5; 318/432
[58] Field of Search .................................. 318/244, 245, 318/432, 433; 388/801, 803, 806, 907.2, 907.5

[56] References Cited

U.S. PATENT DOCUMENTS

| | | |
|---|---|---|
| 3,999,111 | 12/1976 | Bailey . |
| 4,079,301 | 3/1978 | Johnson, III . |
| 4,408,147 | 10/1983 | Gabel . |
| 4,422,022 | 12/1983 | Hill et al. . |
| 4,520,299 | 5/1985 | Konrad . |

(List continued on next page.)

FOREIGN PATENT DOCUMENTS

| | | |
|---|---|---|
| 0 223 101 | 5/1987 | European Pat. Off. . |
| 06311775 | 11/1994 | Japan . |
| 2 120 421 | 11/1983 | United Kingdom . |
| WO 91/15379 | 10/1991 | WIPO . |
| WO 93/19949 | 10/1993 | WIPO . |
| WO 93/20611 | 10/1993 | WIPO . |

OTHER PUBLICATIONS

Hong et al., "Microprocessor–Based High–Efficiency Drive of a DC Motor" IEEE Transactions on Industrial Electronics, vol. IE–34, No. 4, Nov. 1987, pp. 433–440, XP 002045489.

(List continued on next page.)

*Primary Examiner*—Bentsu Ro
*Attorney, Agent, or Firm*—Killworth, Gottman, Hagan, & Schaeff LLP

[57] ABSTRACT

A motor control system is provided comprising an electrically charged battery, an electrical motor, a battery voltage sensor, a motor speed sensor, an armature voltage sensor, an armature current sensor, and a microprocessor. The magnitude of the armature current applied to the motor is a function of a predetermined armature current setpoint signal and the magnitude of the field current applied to the motor is a function of a predetermined field current setpoint signal, a field current correction signal, and a field current de-boost signal. The microprocessor programmed to generate an armature current setpoint signal, a field current setpoint signal, and an armature voltage reference signal. Further, the microprocessor is programmed to (i) compare the armature voltage reference signal to the measured armature voltage signal and generate an armature voltage error signal based on the comparison; (ii) generate the field current correction signal as a function of the armature voltage error signal; (iii) generate an armature-to-field current check function, wherein the check function defines a set of armature current to field current ratio values as a function of armature current; (iv) calculate a ratio of the measured armature current signal to the field current setpoint signal to establish an operating ratio value, (v) compare the operating ratio value to a corresponding armature current to field current ratio value of the armature-to-field current check function, and (vi) establish the field current de-boost signal, wherein the magnitude of the field current de-boost signal is a function of the measured armature current signal and the comparison of the operating ratio value to the corresponding ratio value.

29 Claims, 10 Drawing Sheets

U.S. PATENT DOCUMENTS

| | | | |
|---|---|---|---|
| 4,788,479 | 11/1988 | Rodi | 318/350 |
| 5,039,924 | 8/1991 | Avitan . | |
| 5,070,283 | 12/1991 | Avitan . | |
| 5,264,763 | 11/1993 | Avitan . | |
| 5,349,279 | 9/1994 | Avitan . | |
| 5,453,672 | 9/1995 | Avitan . | |
| 5,585,706 | 12/1996 | Avitan . | |
| 5,642,023 | 6/1997 | Journey . | |
| 5,793,175 | 8/1998 | Journey | 318/493 |
| 5,814,958 | 9/1998 | Journey | 318/493 |

OTHER PUBLICATIONS

Park et al, "Microprocessor–Based Optimal–Efficiency Drive of an Induction Motor" IEEE Transactions on Industrial Electronics, vol. 1E–31, No. 1, Feb. 1984, pp. 69–73.

Hong et al., "Microprocessor–Based High–Efficiency Drive of a DC Motor" IEEE Transactions on Industrial Electronics, vol. 1E–34, No. 4, Nov. 1987, pp. 433–440.

Park et al., "Microprocessor–Based High Efficiency Drive of a DC Series Motor" IECON '84, pp. 455–459.

N. Mohan, "Improvement in Energy Efficiency of Induction Motors by Means of Voltage Control" IEEE Transactions of Power Apparatus and Systems, vol. PAS–99, No. 4 Jul./Aug. 1980, pp. 1466–1471.

Avitan et al., "Mathematical Modeling and Computer Simulation of a Separately Excited dc Motor with Independent Armature/Field Control" IEEE Transactions on Industrial Electronics, vol. 37, No. 6 Dec. 1990, pp. 483–489.

M. H. Rashid, "Automatic armature and field control of d.c. series motors" IEEE Proc., vol. 128, Pt. B, No. 1, Jan. 1981, pp. 73–78.

Funabiki et al., "Current commands for high–efficiency torque control of DC shunt motor" IEE Proceedings–B, vol. 138, No. 5, Sep. 1991, pp. 227–232.

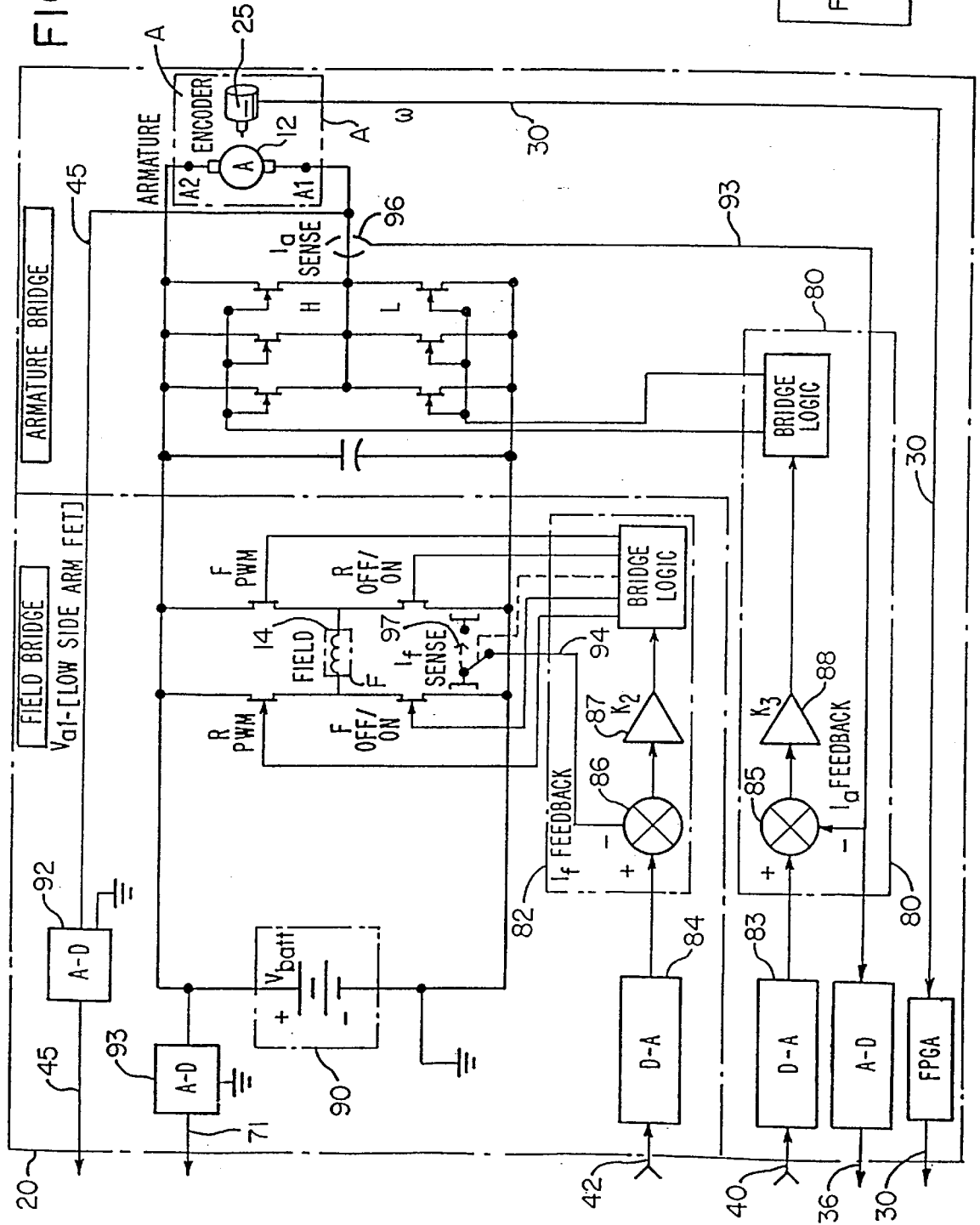

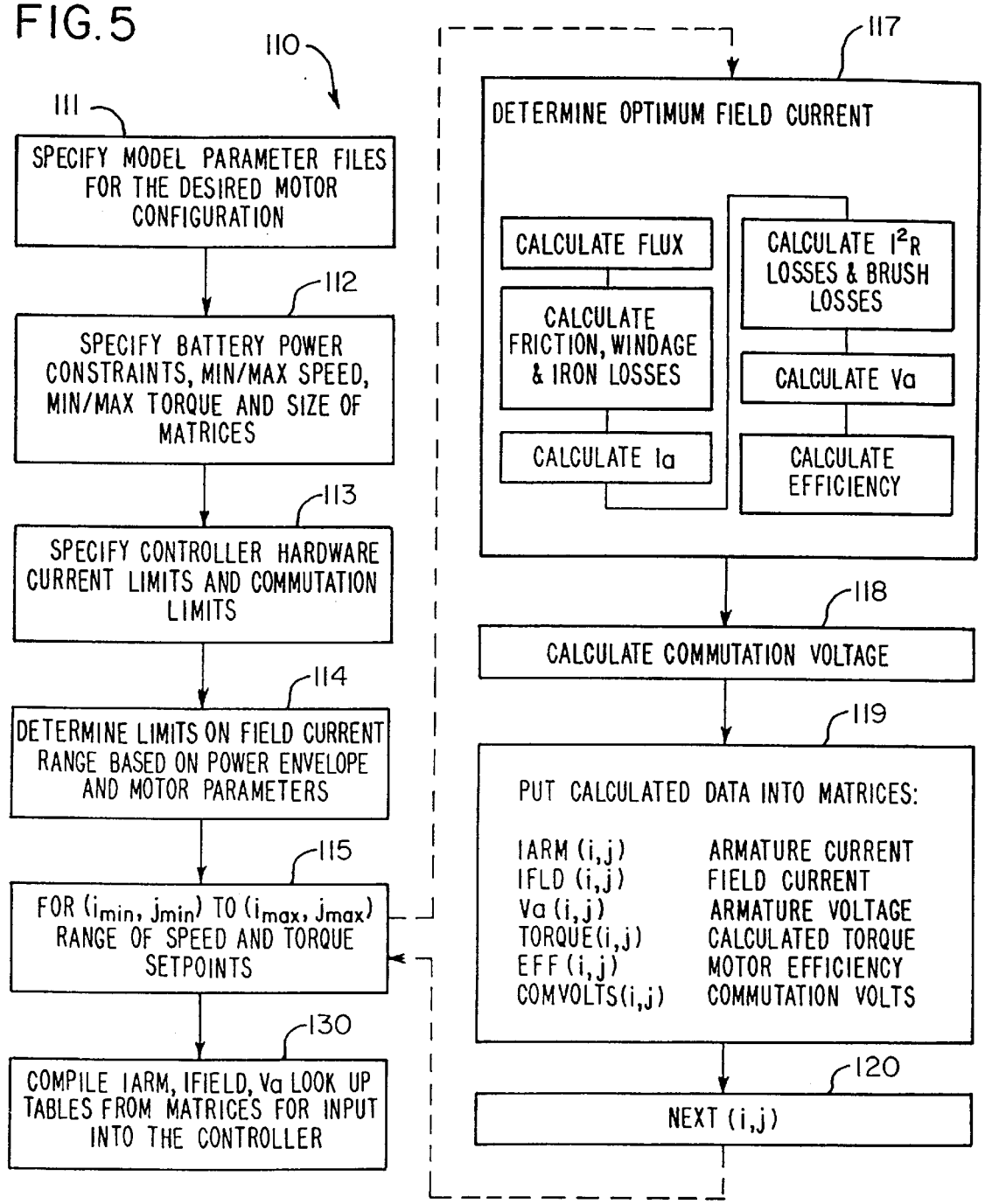

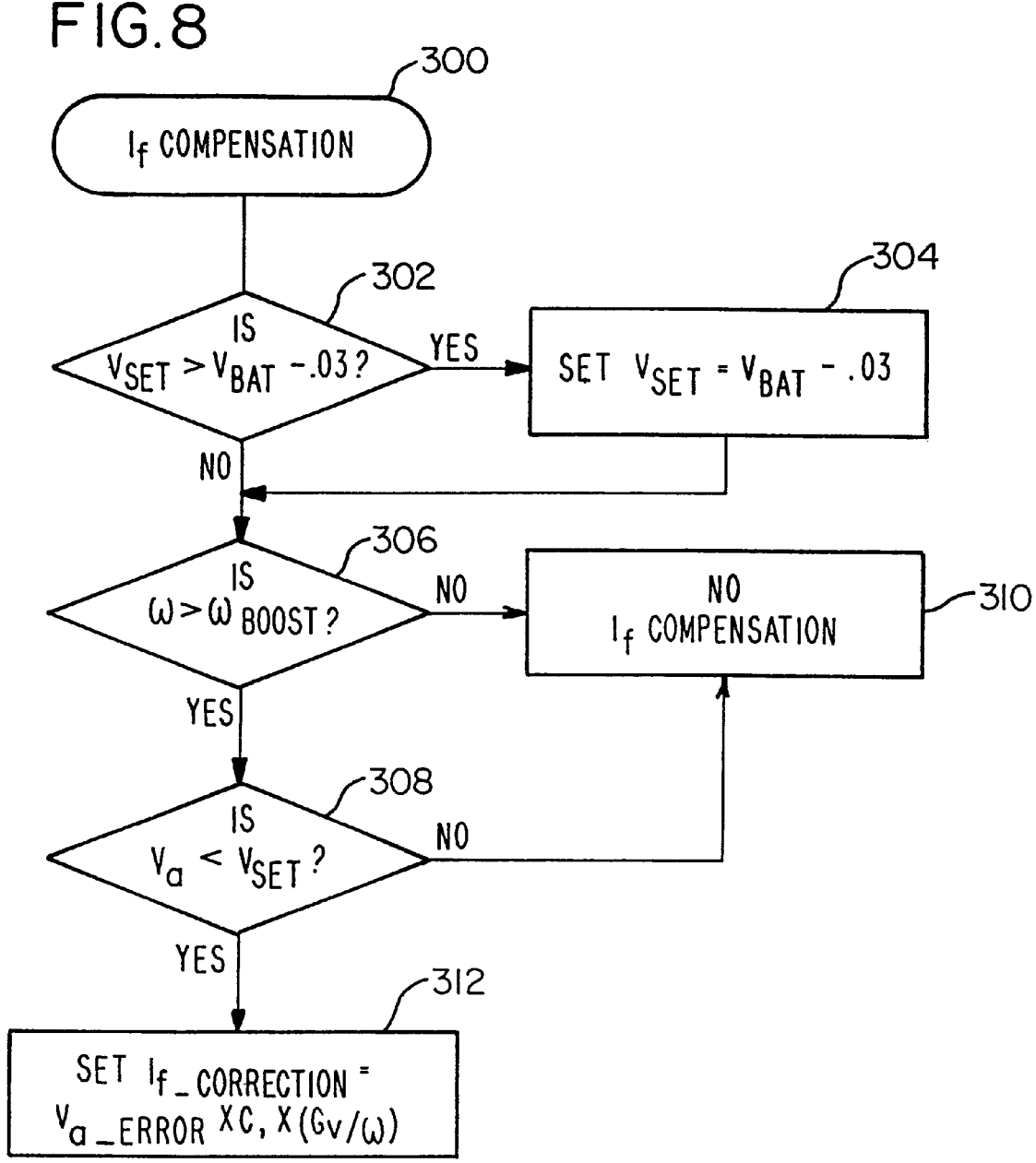

SEPARATELY EXCITED DC MOTOR WITH BOOST AND DE-BOOST CONTROL

CROSS REFERENCE TO RELATED APPLICATIONS

This application claims the benefit of the following U.S. Provisional Applications: Ser. No. 60/060,430 for SEPARATELY EXCITED DC MOTOR CONTROL CIRCUIT, filed Sep. 30, 1997; and Ser. No. 60/060,460 for FIELD DE-BOOST FOR SEPARATELY EXCITED DC MOTOR, filed Sep. 30,1997. This application is a Continuation-in-Part of U.S. patent application Ser. No. 08/889,227 for CONTROL SYSTEM FOR SEPARATELY EXCITED DC MOTOR, filed Jul. 8, 1997, now U.S. Pat. No. 5,878,189.

BACKGROUND OF THE INVENTION

The present invention relates to control of separately excited DC motors and, more particularly, to a control scheme for a separately excited DC motor wherein a field current signal is selectively boosted or de-boosted to expand the power envelope of the DC motor.

One problem with microprocessor control of separately excited motors results from the fact that the field flux expected from a given field current, as derived from the motor equations employed, is not always as expected. Specifically, actual field flux will differ from a given value, primarily as a result of magnetic hysteresis in the field poles. This variation in field flux is also attributable to motor-to-motor variations arising from manufacturing tolerances. Thus, while theory may predict optimal motor performance under given torque and speed conditions, in reality, the resulting operation is often not what is expected or desired. Accordingly, there is a need for a motor control scheme for a separately excited DC motor that accounts for the difference between the expected field flux and the actual field flux to improve the operation of the motor.

Another problem associated with microprocessor control of battery-powered separately excited motors arises when the voltage of the battery power source decreases with use. As the voltage decreases, the armature current decreases and the performance of the motor suffers. Accordingly, there is a need for a motor control scheme for a separately excited DC motor that additionally accounts for the decrease in battery voltage and armature current.

SUMMARY OF THE INVENTION

These needs are met by the present invention wherein a motor control system is provided including a microprocessor programmed to modify the field current of a separately excited motor to account for any reduction in battery voltage by increasing the armature current. The microprocessor is also programmed to generate an armature voltage reference signal and a field current setpoint, compare the armature voltage reference signal to a measured armature voltage signal, generate an armature voltage error signal based on the comparison, and generate a field current correction signal as a function of the armature voltage error signal.

In a preferred embodiment of a motor control scheme according to the present invention, the field current is de-boosted when battery voltage begins to fall in order to maintain desired motor performance. Field de-boost is a field current modification based on an error signal between an armature current lookup table value and a measured armature current when armature voltage is substantially equal to battery voltage. Improved control over motor torque within the commutation limit of the motor is achieved for battery conditions below 90% state of charge. The field de-boost calculation adjusts the field current lookup table value to increase actual armature current up to the setpoint value. Field de-boost is only active during motoring, armature current positive forward and reverse states.

In addition, according to the motor control scheme of the present invention, the microprocessor may be programmed to execute a field current control function wherein optimal field current and armature current setpoints are established in accordance with tabulated values selected for providing a required torque and speed. A table of corresponding armature voltage values is also maintained. Flux losses in the motor are detected indirectly by measuring the motor's armature voltage. Specifically, a reduction of back EMF acting on the armature indicates a flux decrease. A voltage sensor sends measured values of armature voltage to an armature voltage comparator for comparison with expected values thereof as read out from the above-mentioned table. The differences are used for adjusting the field current setpoint and thereby adjusting the flux.

More specifically, the controller of this invention compensates for flux losses by using a table of armature voltage values to determine an armature voltage reference point. An armature voltage sensor measures the actual average armature voltage and sends the measured value back to a microprocessor. The microprocessor compares the measured armature voltage with the armature voltage reference point and multiplies the difference by a variable gain factor to obtain a correction term. The correction term then is added to the field current setpoint in order to adjust flux as required.

The look-up tables of the present invention, described in further detail herein, output field and armature current values that are optimized to minimize component heating by minimizing armature current. The tables are generated based on empirical fit functions to dynamometer data on a limited sampling of a particular motor configuration. Since the tables are constructed based on a defined model, component tolerances, wear, heating, and state of battery charge can contribute to sample-to-sample variances in resultant output horsepower or energy conversion. Further, since the tables are built using a nominal battery voltage at 90% state of charge, any level below this will not only lower armature voltage but will also lower armature current, resulting in a reduction in peak torques and a corresponding premature loss in vehicle acceleration. Peak torque reduction can be lessened by holding armature currents to their desired level.

In accordance with one embodiment of the present invention, a motor control system is provided comprising an electrically charged battery, an electrical motor, a battery voltage sensor, an armature voltage sensor, an armature current sensor, and a microprocessor. The electrical motor is coupled to the battery and includes an armature assembly responsive to an armature current and a field assembly responsive to a field current. The magnitude of the armature current is a function of a predetermined armature current setpoint signal $I_{a\_SET}$. The magnitude of the field current is a function of a predetermined field current setpoint signal $I_{f\_SET}$ and a field current de-boost signal $I_{f\_DE-BOOST}$. The battery voltage sensor is arranged to generate an operating battery voltage signal $V_{BAT}$. The armature voltage sensor is arranged to generate a measured armature voltage signal $V_a$ from the electrical potential of the armature assembly. The armature current sensor is arranged to generate a measured armature current signal $I_a$ indicative of an amount of current flowing through the armature assembly. The microprocessor is programmed to generate an armature current setpoint signal $I_{a\_SET}$, a field current setpoint signal $I_{f\_SET}$, and an armature-to-field current check function. The check function defines a set of armature current to field current ratio values $(I_a/I_f)_{CHECK}$ as a function of armature current. The microprocessor is also programmed to calculate a ratio of the measured armature current signal $I_a$ to the field current setpoint signal $I_{f\_SET}$ to establish an operating ratio value $I_a/I_{f\_SET}$ and to compare the operating ratio value $I_a/I_{f\_SET}$ to a corresponding armature current to field current ratio value $(I_a/I_f)_{CHECK}$ of the armature-to-field current check function. Finally, the microprocessor is programmed to establish the field current de-boost signal $I_{f\_DE-BOOST}$, wherein the magnitude of the field current de-boost signal $I_{f\_DE-BOOST}$ is a function of the measured armature current signal $I_a$ and the comparison of the operating ratio value $I_a/I_{f\_SET}$ to the corresponding ratio value $(I_a/I_f)_{CHECK}$.

The microprocessor may be programmed to compare the operating ratio value $I_a/I_{f\_SET}$ to the corresponding armature current to field current ratio value $(I_a/I_f)_{CHECK}$ by determining whether the operating ratio value $I_a/I_{f\_SET}$ is greater than the corresponding ratio value $(I_a/I_f)_{CHECK}$. The microprocessor may be programmed to establish the magnitude of the field current de-boost signal $I_{f\_DE-BOOST}$ according to a selected one of two distinct de-boost equations. The identity of the selected equation depends upon the outcome of the comparison of the operating ratio value $I_a/I_{f\_SET}$ to the corresponding armature current to field current ratio value $(I_a/I_f)_{CHECK}$.

Preferably, the two distinct de-boost equations are as follows:

$$I'_{f\_SET} = \frac{I_a}{(I_a/I_f)_{CHECK}}$$

$$I'_{f\_SET} = I_{f\_SET} - [(I_{a\_ERROR}) \times I_{f\_GAIN}]$$

where $I_{f\_SET}'$ represents a de-boosted field current setpoint signal, where $I_{f\_GAIN}$ represents a preselected gain parameter, and wherein the microprocessor is further programmed to generate an armature current error signal $I_{a\_ERROR}$ by comparing the armature current setpoint signal $I_{a\_SET}$ and the measured armature current signal $I_a$. Preferably, the microprocessor is programmed to select the first equation when the operating ratio value $I_a/I_{f\_SET}$ is greater than the corresponding armature current to field current ratio value $(I_a/I_f)_{CHECK}$ and to select the second equation when the operating ratio value $I_a/I_{f\_SET}$ is not greater than the corresponding armature current to field current ratio value $(I_a/I_f)_{CHECK}$.

The electrical motor is characterized by a set of commutation limits and the microprocessor is preferably programmed to generate the armature-to-field current check function such that the check function simulates the commutation limits as a function of armature current. Preferably, the armature-to-field current check function is defined by the following equations:

$$(I_a/I_f)_{CHECK} = (I_a/I_f)_{MAX} + (I_a/I_f)_{GAIN} - (I_a/I_f)_{SLOPE} \quad \text{equation (1)}$$

$$(I_a/I_f)_{CHECK} = (I_a/I_f)_{MIN} + (I_a/I_f)_{GAIN} \quad \text{equation (2)}$$

where $(I_a/I_f)_{MAX}$ represents a maximum armature current to field current ratio within the commutation limits, $(I_a/I_f)_{MIN}$ represents a minimum armature current to field current ratio within the commutation limits, $(I_a/I_f)_{GAIN}$ represents the following product $$G_{DE\_BOOST} \times (V_{REF} - V_{BAT})$$

where $G_{DE-BOOST}$ is a predetermined gain parameter, $V_{REF}$ represents a reference battery voltage, e.g., 36 volts, and $(I_a/I_F)_{SLOPE}$ represents the following product $$I_a \times m_{DE\_BOOST}$$

where $m_{DE-BOOST}$ is a predetermined slope parameter. The predetermined gain parameter $G_{DE-BOOST}$ represents an allowable increase in armature to field current ratio per battery volts. The predetermined slope parameter represents a maximum ratio of armature to field current per amp of armature current. The microprocessor may be programmed to generate the armature to field current check function such that the check function is defined by equation (1) when $$(I_a/I_f)_{CHECK} > [(I_{a/If})_{MIN} + (I_a/I_f)_{GAIN}]$$

and by equation (2) when $$(I_a/I_f)_{CHECK} < [(I_a/I_f)_{MIN} + (I_a/I_f)_{GAIN}]$$

The microprocessor may further be programmed to: generate a full-on indication signal when the measured armature voltage signal $V_a$ is substantially equal to the operating battery voltage signal $V_{BAT}$; generate an armature current error signal $I_{a\_ERROR}$ by comparing the armature current setpoint signal $I_{a\_SET}$ and the measured armature current signal $I_a$; generate a low armature current indication signal when the armature current error signal $I_{a\_ERROR}$ exceeds a predetermined value; and enable the field current de-boost signal establishing step according to whether the full-on indication signal and the low armature current indication signal are generated. Preferably, the microprocessor is further programmed to generate the armature current error signal according to the following equation $I_{a\_ERROR} = I_a - I_{a\_SET}$ and to generate the full-on indication signal when $V_a > V_{BAT} - V_{BAT\_TOLERANCE}$, where $V_{BAT\_TOLERANCE}$ is a predetermined voltage tolerance. Alternatively, the microprocessor is programmed to generate the low armature current indication when $I_a < I_{a\_SET} - I_{a\_TOLERANCE}$, where $I_{a\_TOLERANCE}$ is a predetermined current tolerance.

The field assembly may be further responsive to a field current correction signal $I_{f\_CORRECTION}$, the motor control system may further comprise a motor speed sensor arranged to generate an actual motor speed signal $\omega$ representative of an actual speed of the electrical motor, and the microprocessor may be further programmed to: generate an armature voltage reference signal $V_{a\_REF}$, compare the armature voltage reference signal $V_{a\_REF}$ to the measured armature voltage signal $V_a$ and generate an armature voltage error signal $V_{a\_ERROR}$ based on the comparison, and generate the field current correction signal $I_{f\_CORRECTION}$ as a function of the armature voltage error signal.

In accordance with yet another embodiment of the present invention, a motor control system is provided comprising an electrically charged battery, an electrical motor, a battery voltage sensor, a motor speed sensor, an armature voltage sensor, an armature current sensor, and a microprocessor. The electrical motor is coupled to the battery and includes an armature assembly responsive to an armature current and a field assembly responsive to a field current. The magnitude of the armature current is a function of a predetermined armature current setpoint signal $I_{a\_SET}$ and the magnitude of the field current is a function of a predetermined field current setpoint signal $I_{f\_SET}$, a field current correction signal $I_{f\_CORRECTION}$, and a field current de-boost signal $I_{f\_DE-BOOST}$. The microprocessor programmed to generate an armature current setpoint signal $I_{a\_SET}$, a field current setpoint signal $I_{f\_SET}$, and an armature voltage reference signal $V_{a\_REF}$. Further, the microprocessor is programmed to (i) compare the armature voltage reference signal $V_{a\_REF}$ to the measured armature voltage signal $V_a$ and generate an armature voltage error signal $V_{a\_ERROR}$ based on the comparison; (ii) generate the field current correction signal $I_{f\_CORRECTION}$ as a function of the armature voltage error signal; (iii) generate an armature-to-field current check function, wherein the check function defines a set of armature current to field current ratio values $(I_a/I_f)_{CHECK}$ as a function of armature current; (iv) calculate a ratio of the measured armature current signal $I_a$ to the field current setpoint signal $I_{f\_SET}$ to establish an operating ratio value $I_a/I_{f\_SET}$, (v) compare the operating ratio value $I_a/I_{f\_SET}$ to a corresponding armature current to field current ratio value $(I_a/I_f)_{CHECK}$ of the armature-to-field current check function, and (vi) establish the field current de-boost signal $I_{f\_DE\-BOOST}$, wherein the magnitude of the field current de-boost signal $I_{f\_DE\-BOOST}$ is a function of the measured armature current signal $I_a$ and the comparison of the operating ratio value $I_a/I_{f\_SET}$ to the corresponding ratio value $(I_a/I_f)_{CHECK}$.

The microprocessor may further be programmed to generate the field current correction signal $I_{f\_CORRECTION}$ such that it is inversely proportional to the actual motor speed signal $\omega$, to generate the field current correction signal $I_{f\_CORRECTION}$ as a function of the armature voltage error signal $V_{a\_ERROR}$ and the actual motor speed signal $\omega$, or to generate the field current correction signal $I_{f\_CORRECTION}$ according to the following equation:

$$I_{f\_CORRECTION} = V_{a\_ERROR} \times C_1 \times (G_v/\omega)$$

where $V_{a\_ERROR}$ is the armature voltage error signal, $C_1$ is a constant, $G_v$ is a variable gain parameter, and $\omega$ is the actual speed of the motor. The microprocessor may be further programmed to modify the measured armature voltage signal $V_a$ by summing the measured armature voltage signal $V_a$ and the operating battery voltage signal $V_{BAT}$ prior to comparing the measured armature voltage signal $V_a$ to the armature voltage reference signal $V_{a\_REF}$.

The motor control system may further comprise a speed command generator arranged to generate a speed command signal S indicative of a desired speed of the electrical motor and the microprocessor may be further programmed to generate the armature voltage reference signal $V_{a\_REF}$, the field current setpoint $I_{f\_SET}$, and the armature current setpoint $I_{a\_SET}$ as a function of the speed command signal S and the actual motor speed signal $\omega$. The microprocessor may additionally be programmed to generate the armature voltage reference signal $V_{a\_REF}$, the field current setpoint $I_{f\_SET}$, and the armature current setpoint $I_{a\_SET}$ from a look-up table having at least one input value derived from the speed command signal S and the actual motor speed signal $\omega$. The look-up table may be a dual-input look-up table, wherein a first input of the look-up table comprises a torque setpoint signal $T_{SET}$, and wherein a second input of the look-up table comprises the actual motor speed signal $\omega$. The microprocessor may be programmed to generate the torque setpoint signal $T_{SET}$ as a function of the actual motor speed signal $\omega$ and the speed command signal S.

Accordingly, it is an object of the present invention to provide a motor control scheme for a separately excited DC motor that accounts for the difference between the expected field flux and the actual field flux to expand the power envelope of the motor. Other objects of the present invention will be apparent in light of the description of the invention embodied herein.

BRIEF DESCRIPTION OF THE DRAWINGS

The following detailed description of the present invention can be best understood when read in conjunction with the following drawings, where like structure is indicated with like reference numerals and in which:

FIGS. 2 and 3 are complementary portions of a detailed schematic block diagram illustrating a motor control system of the present invention;

FIG. 4 illustrates the manner in which FIGS. 2 and 3 are combined to form a complete detailed schematic block diagram of the motor control system of the present invention;

FIG. 5 is a flow chart illustrating the process by which voltage and current values are determined and stored in look-up tables according to the present invention;

FIG. 8 is a flow chart illustrating a field current compensation scheme of the present invention;

DETAILED DESCRIPTION OF THE INVENTION

Figure 1:
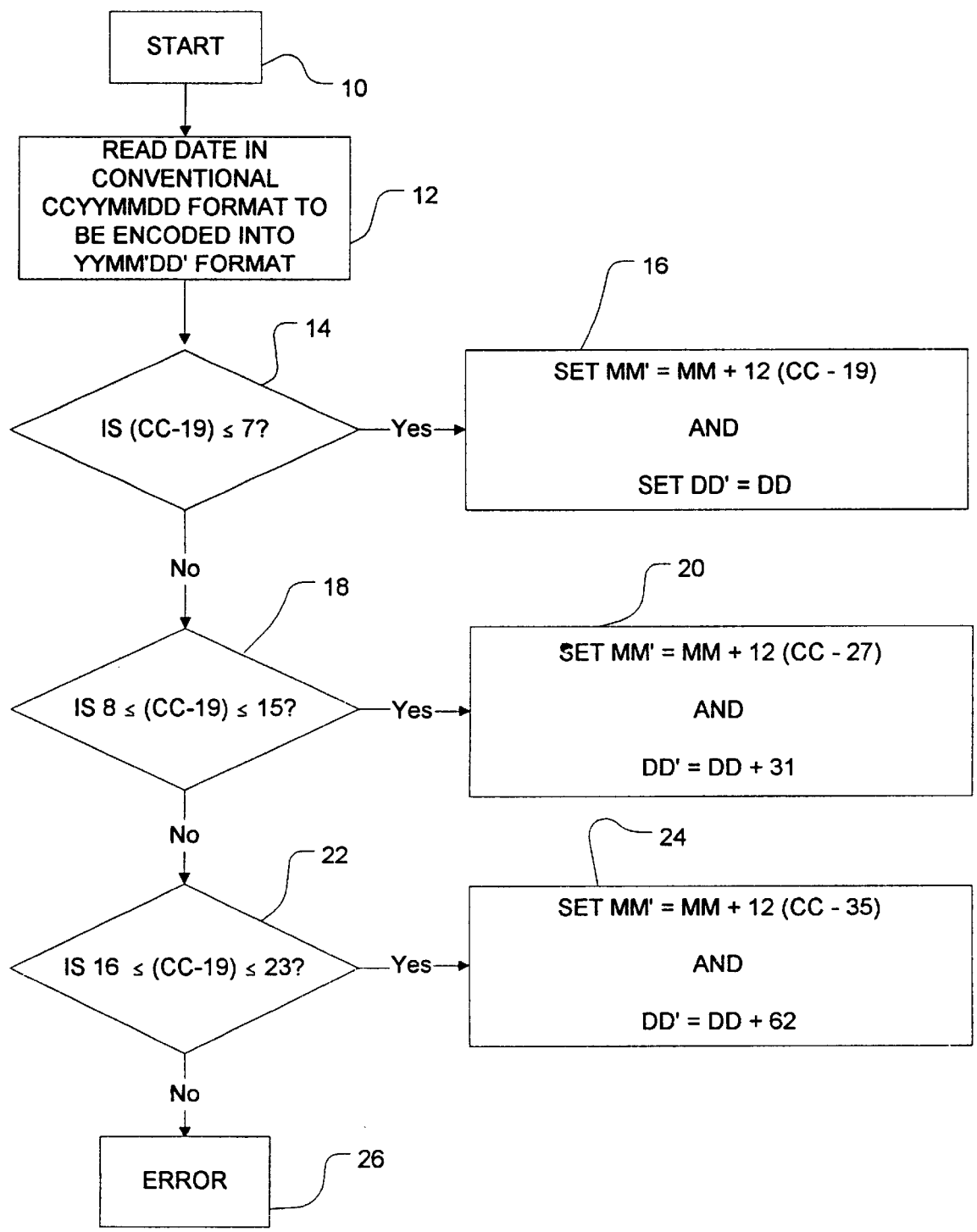
FIG. 1 is a schematic block diagram illustrating a motor control system of the present invention.

Referring now to FIGS. 1–4, a motor control system 100 according to the present invention is illustrated in detail. The motor control system 100 comprises an electrical motor 10 including an armature assembly 12 and a field assembly 14, a speed command generator 16, an armature voltage sensor (see line 45), a microprocessor 15, and a motor control circuit 20. A speed sensor 25, e.g., an encoder or tachometer, provides an output on a line 30 representing the actual speed $\omega$ (rad/sec) of the motor 10.

Shown within the microprocessor 15 are several blocks that represent functions performed by the microprocessor 15 and the associated hardware. The blocks or routines of particular interest include a speed comparator function 50, a set of two-way look up tables 60, an armature voltage error function 70, an armature current error function 73, and a field current modification function 75.

Setpoint Determination.

The speed comparator function 50 compares a speed command signal on a line 35 to the actual motor speed signal on the line 30 and, in response thereto, provides a torque command signal on a line 55 to the look up tables 60. Specifically, referring to FIGS. 2 and 3, which figures represent respective portions of the entire motor control system 100 and which figures are interconnected to one another as shown in FIG. 4, the speed command signal s on the line 35 and the actual speed signal ω on the line 30 are applied to the speed comparator function 50 in the microprocessor 15. More specifically, the signals s and ω are inputs to a comparator 51, the output of which is applied to an amplifier function or amplifier 52 which has a gain Kp set to command a torque high enough for rapid response to a speed error but low enough to avoid stability problems. Thus, the output of amplifier 52 is Tp=Kp(s−ω)).

Proportional plus integral control (PIC) is achieved by integrating the speed error and adding the result to the output of the amplifier 52. This is done by an amplifier function or amplifier 53, which integrates the output of the comparator 51. Thus, its output is Ti=Ki∫(s−ω)dt. The outputs of the amplifiers 52 and 53 are added by function 54, giving the torque setpoint signal T=Ti+Tp on the line 55. The gain Kp of the amplifier function 52 and the gain Ki of the amplifier function or amplifier 53 are conditionally proportional to the motor speed signal on the line 30. At low motor speed, the gain is higher than at higher speeds. This provides stability and the necessary torque for hill holding. The amplifier 52 provides the initial response to a new speed command. The response from the integrator amplifier 53 builds up slowly and predominates as the speed error is driven to zero. The steady state output from the integrator amplifier 53 produces torque setpoint values appropriate for handling a steady state load with no error signal from the speed comparator 51.

Referring now to the look up tables 60, table 62 contains a matrix of expected armature voltage values $V_a$, table 64 contains a matrix of field current values $I_f$, and table 66 contains a matrix of armature current values $I_a$. Field current and armature current setpoints are produced by the look-up tables 64 and 66, based upon the actual speed signal ω and the torque command or torque setpoint signal on the line 55, and are applied to the motor control circuit 20. The field current setpoint is modified by the field current modification function 75, as will be explained in detail below.

It is contemplated by the present invention that, although the embodiment described herein, where the torque setpoint signal and the actual speed signal ω are used as inputs to a look up table to determine the field current and armature current setpoints and the expected armature voltage values, others schemes may be employed to determine the setpoints and expected values without departing from the scope of the present invention. This is particularly the case for embodiments of the present invention where the determination of these values is not the critical aspect of the particular embodiment.

Field Current Modification.

Figure 7C:
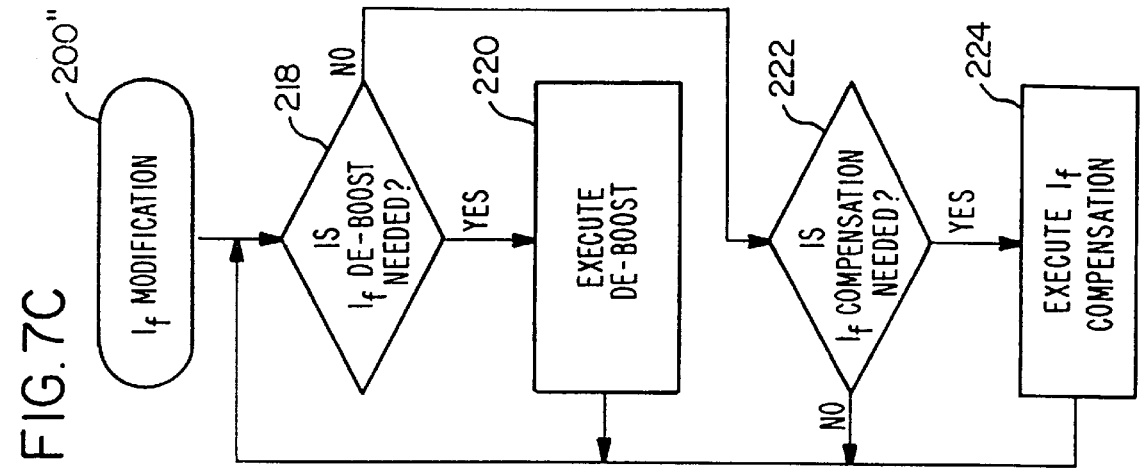
FIGS. 7A–C are flow chart illustrating alternate field current modification schemes of the present invention.
Figure 7B:
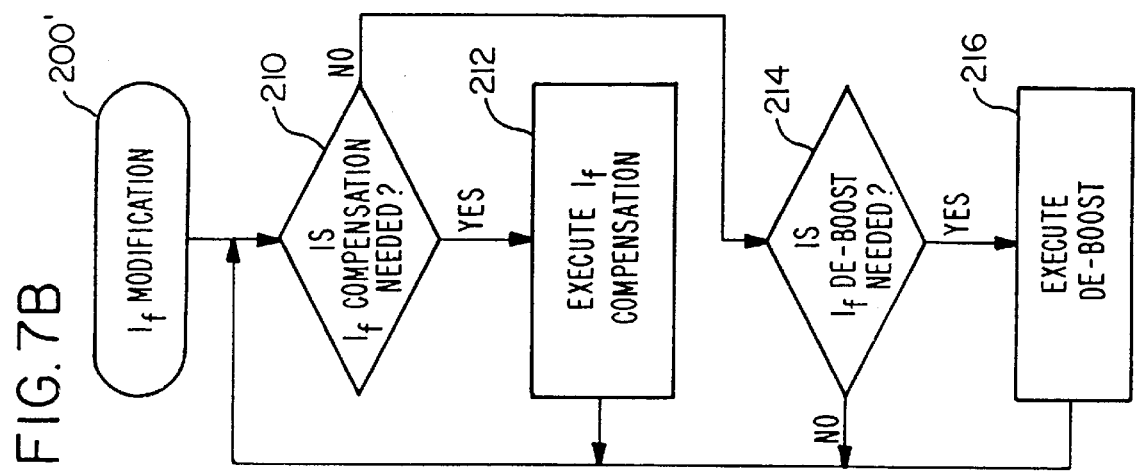
Figure 7A:
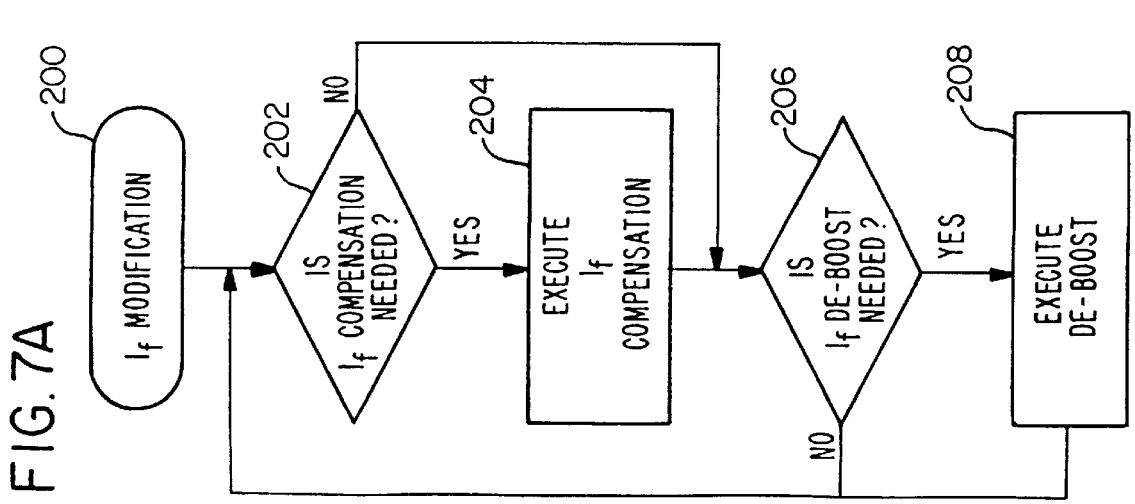

Referring to FIGS. 7A to 7C, three schemes for executing field current modification according to the present invention are illustrated. Generally, the field current modification function 75 includes two distinct components: field current compensation (also identifiable as field current boost) and field current de-boost. The field current compensation component is described in detail herein with reference to FIGS. 1–3 and 8. The field current de-boost component is described in detail herein with reference to FIGS. 1–3 and 9–18.

The first scheme for achieving field current compensation and field current de-boost is illustrated in FIG. 7A, wherein the field modification routine 200 first determines whether field compensation is needed, see step 202. If field compensation is needed, it is executed, see step 204, if not, the routine 200 determines whether field de-boost is needed, see step 206. If field de-boost is needed, it is executed, see step 208, if not, the routine returns to step 202. The field modification routine 200' of FIG. 7B is slightly different that the routine 200' of FIG. 7A. Specifically, the field modification routine 200' first determines whether field compensation is needed, see step 210. If field compensation is needed, it is executed, see step 212, and the routine returns to step 210 without even attempting to determine if de-boost is needed. If, and only if, field compensation is not needed, does the routine 200' attempt to determine whether field de-boost is needed, see step 214. If field de-boost is needed, it is executed, see step 216, if not, the routine returns directly to step 210. The field compensation routine 200" of FIG. 7C is similar to the one illustrated in FIG. 7B. Specifically, the field modification routine 200" first determines whether field de-boost is needed, see step 218. If field de-boost is needed, it is executed, see step 220, and the routine returns to step 218 without even attempting to determine if field compensation is needed. If, and only if, field de-boost is not needed, does the routine 200" attempt to determine whether field compensation is needed, see step 222. If field compensation is needed, it is executed, see step 224. If not, the routine returns directly to step 218. In the field compensation routine 200' of FIG. 7B, field compensation may be identified as the primary modification scheme, while, in the field compensation routine 200" of FIG. 7C, field de-boost may be identified as the primary modification scheme. Selection of an appropriate modification scheme 200, 200', 200" is dependent upon the specific programming preferences of those practicing the present invention. The alternative routines are merely presented herein to provide a clear description of the present invention. The specific steps involved with executing field current compensation and field current de-boost are described in detail below with reference to FIGS. 8–10.

Field Current Compensation.

Figure 2:
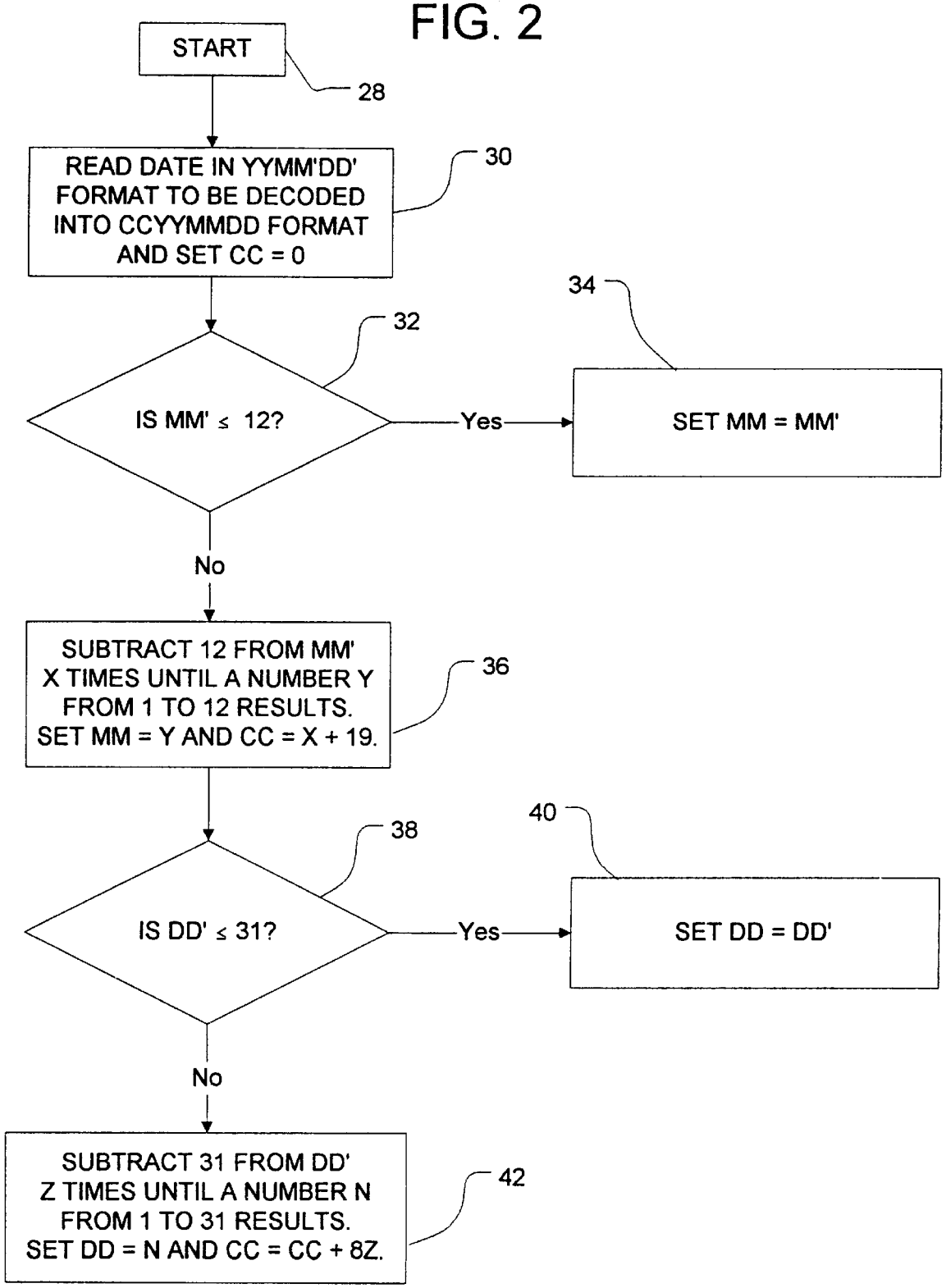

Referring now to FIGS. 1–3, a voltage signal on the line 45 from the armature assembly 12, from which flux level is derived, is fed back to the armature voltage error function 70 of the microprocessor 15. The field current modification function 75 adjusts the field current setpoint in accordance with the signal output from the armature voltage error function 70. Specifically, if the armature voltage on the line 45 is not what is expected, based on the torque command signal on the line 55 and the actual speed of the motor represented on the line 30, then the field current signal on a line 42 is adjusted accordingly. The reason armature voltage will not be as expected is due primarily to hysteresis in the flux characteristics in the motor field poles, and also to motor-to-motor manufacturing tolerances. The armature voltage values $V_a$ in table 62 are calculated based on the expected flux. The expected flux is determined as a function of the nominal flux characteristics of the particular motor. The actual flux of the motor will be somewhat different from the expected flux, due primarily to hysteresis. The motor control scheme of the present invention accounts for this difference in flux by adjusting the field current.

The armature voltage error function 70 includes a comparator function 72 that receives a signal representing battery voltage on a line 71 and a signal representing the voltage $V_{a1}$ from the low voltage side of the armature bridge on the line 45. Both lines 45 and 71 include analog to digital, or A–D, converter circuits, 92 and 93, see FIG. 3. The output $V_a'$ of the comparator function 72 is compared with the output $V_{a\text{-}REFERENCE}$ from the look-up table 62. If the voltage output signal $V_a'$ of the comparator 72 is less than what is called for by the look-up table 62, then an output signal $V_{a\text{-}ERROR}$ is generated and applied to an amplifier 74. The amplifier 74 also receives the motor speed signal $\omega$. The output of the amplifier 74 is added to the $I_f$ setpoint signal on a line 41 in adder function 76 to produce an adjusted or modified $I_f$ setpoint on a line 42.

Regarding the operation of the amplifier 74, it is initially noted that the back EMF E of a motor is defined as $$E = K \times B \times \omega$$

where K is a motor design constant, B is the magnetic flux in the air gap of the motor (the gap between the poles of the field assembly 14 and the core of the armature assembly 12), and $\omega$ is the rotational speed of the armature assembly 12. Differentiating the equation with respect to $I_f$ yields $$dE = K \times dB/dI_f \times \omega \times dI_f$$

Rearranging the equation for $dI_f$ yields $$dI_f = (dE/\omega) \times (dI_f/dB/K).$$

In practice, this equation is implemented in a field adjustment gain term $G_v$ in the following form:

$$I_{f\_CORRECTION} = V_{a\_ERROR} \times C_1 \times (G_v/\omega)$$

where $V_{a\_ERROR}$ is the armature voltage error signal A (see FIG. 2), $C_1$ is a constant, $G_v$ is a variable gain parameter, and $\omega$ is the actual speed of the motor, and where the magnitude of the field current correction signal is inversely proportional to the actual motor speed signal $\omega$. The constant $C_1$ includes the motor constant K, unit scaling corrections, and a coefficient for $dI_f/dB$ where $I_f$ is the field current setpoint and B represents the magnetic flux in the air gap of the electrical motor. The motor constant K is computed as follows $$K = \frac{(N_C)(N_P)}{2\pi(N_A)}$$

where $N_C$ is the number of conductors in the armature assembly 12, $N_P$ is the number of poles in the armature assembly 12, and $N_A$ is the number of parallel armature current paths in the armature assembly 12. The value for $G_v$, the variable gain parameter, is selected to tune the amplifier 74 for optimum performance. It is noted that, although typical values for $G_v$ range from about 100 to about 500, the specific value for $G_v$ is subject to determination for each individual motor to be controlled by the motor control scheme of the present invention.

It is contemplated by the present invention that, in certain embodiments or applications of the present motor control scheme, it may be preferable to establish a threshold motor speed $\omega_{BOOST}$ below which the armature voltage error function will be inactivated. Further, it is contemplated by the present invention that, in certain embodiments or applications of the present motor control scheme, it may be preferable to establish a maximum armature voltage setpoint threshold slightly below the actual value of the battery voltage, e.g., about 0.03 volts below the actual value of the battery voltage. Finally, it is contemplated by the present invention that, in certain embodiments or applications of the present motor control scheme, the field current will be adjusted only where: (i) the actual motor speed is greater than a minimum speed threshold corresponding to the adjusted field current setpoint; and (ii) the actual armature voltage is less than the armature voltage setpoint. Preferably, there are no limitations placed on the degree to which the field current may be increased by the armature voltage error function 70, with the exception, of course, that the field current and the armature voltage setpoint cannot exceed the physical limitations of the battery power source. Specifically, the maximum field current cannot be greater than the battery voltage divided by the field resistance and the armature voltage setpoint cannot be greater than the battery voltage.

Referring now to FIG. 8, certain aspects of a field current compensation routine 300 according to the present invention are illustrated in detail. The routine 300 includes three distinct queries. According to a first query, the routine 300 establishes a maximum value for the armature voltage setpoint when the armature voltage setpoint is close to, or greater than, the actual value of the battery voltage, see steps 302, 304. According to a second query, the routine 300 determines whether the actual motor speed $\omega$ is greater than the predetermined threshold motor speed $\omega_{BOOST}$ and generates a command to disable field current compensation if the actual motor speed $\omega$ is not greater than the threshold motor speed $\omega_{BOOST}$, see steps 306, 310. A final query determines whether the actual armature voltage is less than the armature voltage setpoint, see step 308. If the actual armature voltage is less than the armature voltage setpoint, the field current is corrected according to the above-described algorithm, see step 312. If the actual armature voltage is not less than the armature voltage setpoint, a command to disable field current compensation is generated, see step 310.

Field De-Boost.

Referring now to FIGS. 1–3, 9, and 10, the field current de-boost component 400 of the field current modification routine of the present invention is described in detail. The armature assembly 12 of the motor 10 is responsive to an armature current, the magnitude of which is a function of a predetermined armature current setpoint signal $I_{a\_SET}$ (see FIG. 2, line 40). Similarly, the field assembly 14 is responsive to a field current, the magnitude of which is a function of a predetermined field current setpoint signal $I_{f\_SET}$ (see line 41) and a field current de-boost signal $I_{f\_DE\text{-}BOOST}$ (see line 43). The microprocessor 15 is programmed to generate the armature current setpoint signal $I_{a\_SET}$ and the field current setpoint signal $I_{f\_SET}$, in the manner described in detail herein. Further, the microprocessor 15 is programmed to generate the field current de-boost signal $I_{f\_DE\text{-}BOOST}$ to accomplish suitable modification of the field current according to the present invention.

Generally, referring to the field current de-boost routine 400 illustrated in FIG. 9, as will be described in greater detail in the following paragraphs, the field current de-boost signal $I_{f\_DE\text{-}BOOST}$ is generated after performing a set of predetermined threshold queries, see steps 402, 404, and 406. First, an armature-to-field current check function is generated that defines a set of armature current to field current ratio values $(I_a/I_f)_{CHECK}$ as a function of armature current, see steps 408, 410, and 412. An operating ratio value $I_a/I_{f\_SET}$ is established and compared to a corresponding armature current to field current ratio value $(I_a/I_f)_{CHECK}$ of the armature-to-field current check function, see step 414. The operating ratio value $I_a/I_{f\_SET}$ is calculated as a ratio of the measured armature current signal $I_a$ to the field current setpoint signal $I_{f\_SET}$. The result of the comparison of the operating ratio value $I_a/I_{f\_SET}$ and the field current ratio value $(I_a/I_f)_{CHECK}$ is used to establish the field current de-boost signal $I_{f\_DE-BOOST}$, see steps 416 and 418. The magnitude of the field current de-boost signal $I_{f\_DE-BOOST}$ is a function of the measured armature current signal bIa input from line 36 (see FIGS. 2 and 3) and the comparison of the operating ratio value $I_a/I_{f\_SET}$ to the corresponding ratio value $(I_a/I_f)_{CHECK}$.

The first threshold query is designed to generate a "no de-boost" condition unless the motor 10 is being operated in a "full-on" condition, see steps 402 and 406. Specifically, a full-on indication signal is generated when the measured armature voltage signal $V_a$ is substantially equal to the operating battery voltage signal $V_{BAT}$, for example, when $V_a > V_{BAT} - V_{BAT\_TOLERANCE}$, where $V_{BAT\_TOLERANCE}$ is a predetermined voltage tolerance. The armature voltage signal $V_a$ may be measured directly from the armature or measured indirectly through measurements of the output $V_a'$ of the comparator function 72 on line 69 and the battery voltage signal $V_{BAT}$ on line 71. The field current de-boost signal $I_{f\_DE-BOOST}$ is not generated under the "no de-boost" condition.

The second threshold query is designed to generate a "no de-boost" condition if the armature current is not below a predetermined armature current value, see steps 404 and 406. Specifically, an armature current error signal $I_{a\_ERROR}$ is generated by comparing the armature current setpoint signal $I_{a\_SET}$ and the measured armature current signal $I_a$. A low armature current indication signal is generated when the armature current error signal $I_{a\_ERROR}$ indicates that the measured armature current signal $I_a$ is below the predetermined armature current value. The microprocessor 15 is programmed to generate the armature current error signal according to the following equation: $I_{a\_ERROR} = I_a - I_{a\_SET}$. The generation of the low armature current indication signal is conditioned upon whether the armature current error signal $I_{a\_ERROR}$ exceeds a predetermined current tolerance value $I_{a\_TOLERANCE}$.

Figure 10:
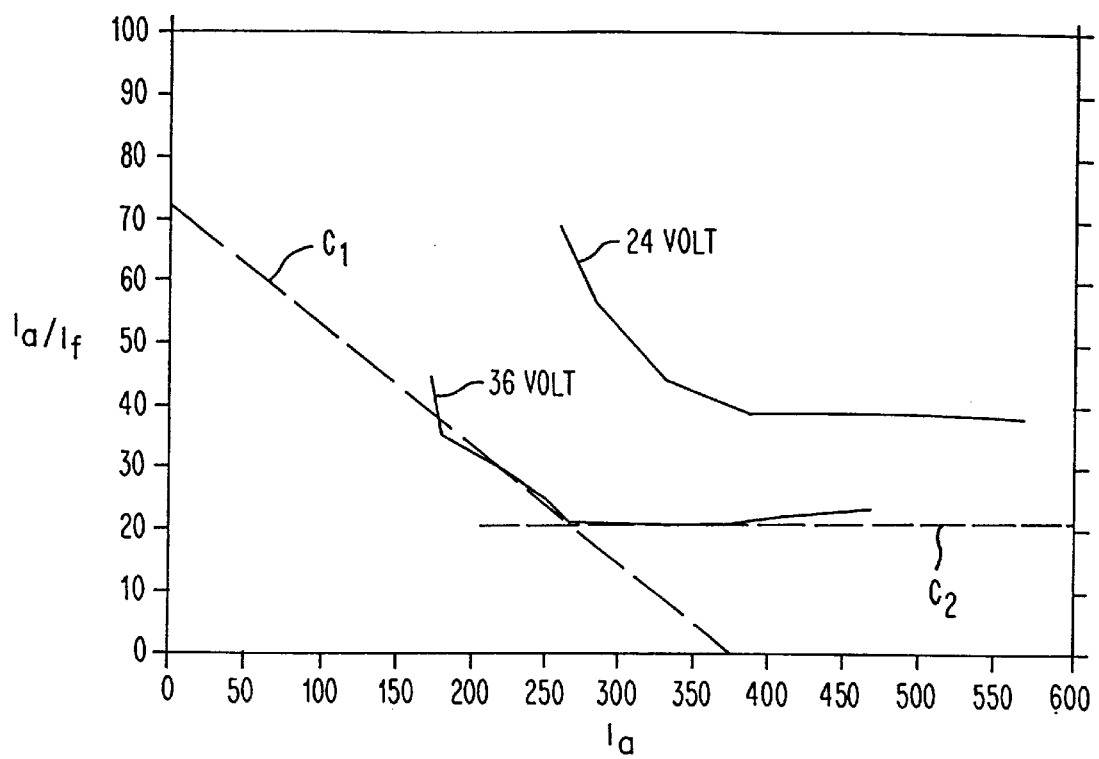
FIG. 10 is a graph illustrating the manner in which an armature-to-field current check function is generated according to the present invention.
Figure 6:
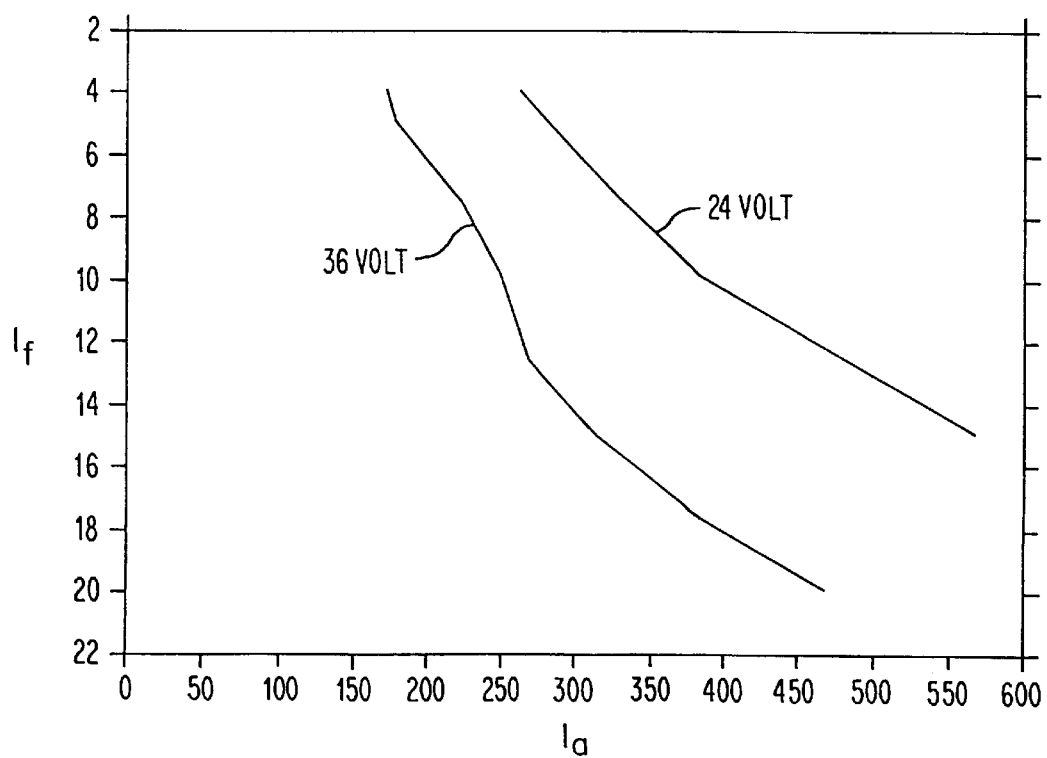
FIG. 6 is a graph illustrating a pair of commutation limit plots for a separately excited DC motor.

The armature-to-field current check function is generated so as to simulate the commutation limits of the electrical motor 10 being controlled. Specifically, referring to FIGS. 6 and 10, the commutation limits of the electrical motor 10 are illustrated. In FIG. 6, the commutation limits of the field and armature currents are plotted for a motor operating at 24 volts and a motor operating at 36 volts. As the graph illustrates, the number of specific armature and field current combinations for operation below the commutation limits of the motor increases as the operating voltage decreases. In FIG. 10, the commutation limit ratio $(I_a/I_f)$ is plotted as a function of armature current, for each operating voltage, to help illustrate the manner in which the check function is determined. Specifically, the check function is generated so as to simulate the commutation limits ratio as a function of armature current for the electrical motor 10 operating at 36 volts. As is described in detail herein appropriately selected gain parameters are utilized to correct the function for operating voltages other than 36 volts.

Referring specifically to FIG. 10, a check function according to the present invention is illustrated as the combination of two distinct sub-functions or lines $C_1$ and $C_2$. The lines $C_1$, $C_2$ are defined so as to represent a close fit approximation of the actual commutation limit ratio plotted as a function of armature current. Specifically, the armature-to-field current check function is defined by the following equations:

$$(I_a/I_f)_{CHECK} = (I_a/I_f) + (I_a/I_f)_{GAIN} - (I_a/I_f)_{SLOPE} \quad \text{equation (1)}$$

$$(I_a/I_f)_{CHECK} = (I_a/I_f)_{MIN} + (I_a/I_f)_{GAIN} \quad \text{equation (2)}$$

$(I_a/I_f)_{MAX}$ represents the maximum armature current to field current ratio within the commutation limits, approximately 72 in the FIG. 10 example. $(I_a/I_f)_{MIN}$ represents the minimum armature current to field current ratio within the commutation limits, approximately 20 in the FIG. 10 example. $(I_a/I_f)_{GAIN}$ represents the following product $$G_{DE\_BOOST} \times (V_{REF} - V_{BAT}),$$

where $G_{de-boost}$ is a predetermined gain parameter, approximately 1.7 in the FIG. 10 example, and $V_{REF}$ represents a reference battery voltage of the commutation limit plot to which the sub-functions or lines are fit, 36 volts in the illustrated example. $(I_a/I_f)_{Slope}$ represents the following product $$I_a \times m_{DE\_BOOST}$$

where $m_{DE-BOOST}$ is a predetermined slope parameter representing the slope of the line $C_1$ in FIG. 10. The predetermined gain parameter $G_{DE-BOOST}$ represents the allowable increase in armature to field current ratio per battery volts. The predetermined slope parameter $m_{DE-BOOST}$ corresponds to a maximum ratio of armature to field current per amp of armature current.

The check function is defined by equation (1) when $$(I_a/I_f)_{CHECK} > [(I_a/I_f)_{MIN} + (I_a/I_f)_{GAIN}]$$

and by equation (2) when $$(I_a/I_f)_{CHECK} < [(I_a/I_f)_{MIN} + (I_a/I_f)_{GAIN}]$$

in order to ensure the check function closely approximates the actual armature current to field current ratio as a function of the armature current.

Figure 9:
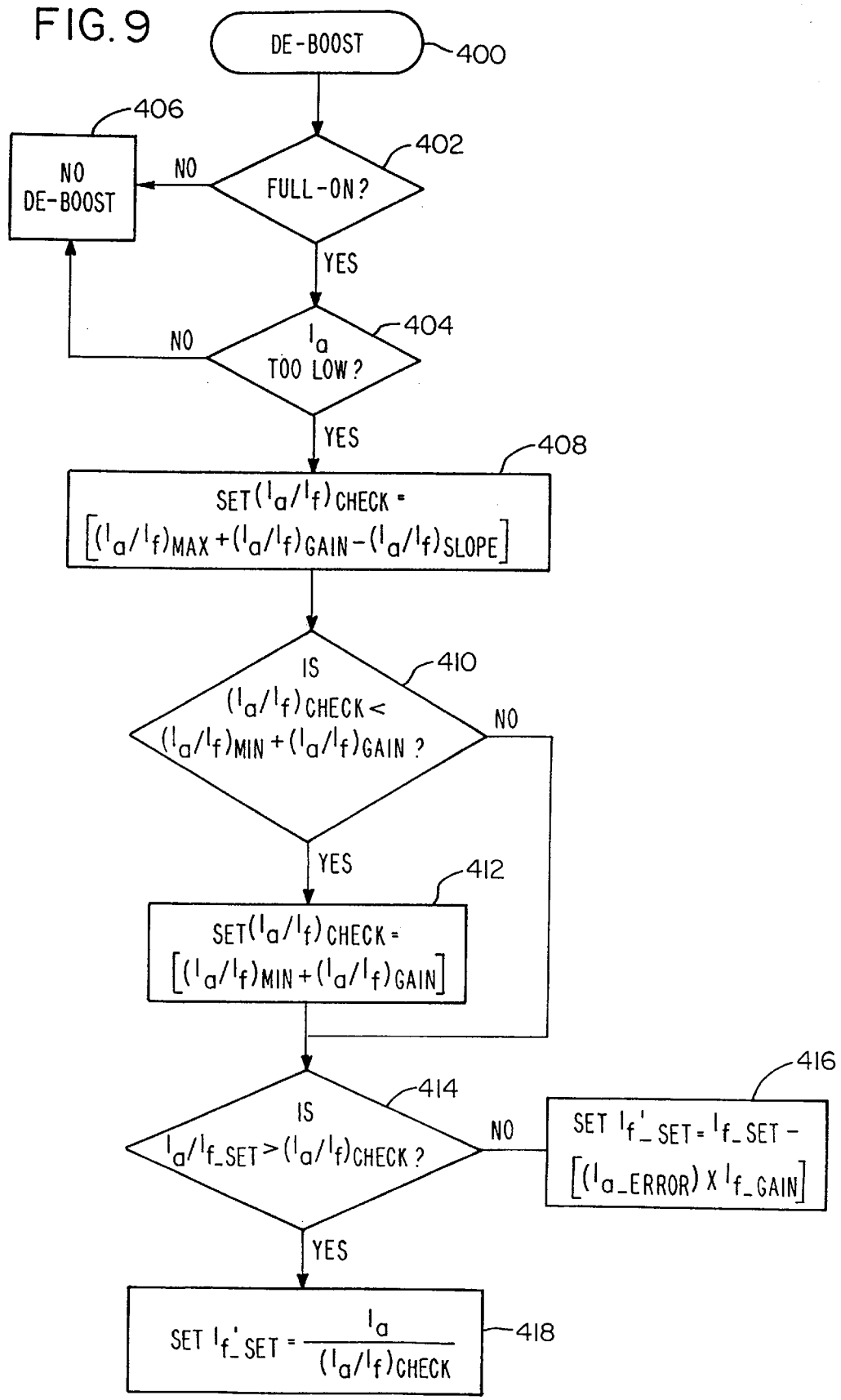
FIG. 9 is a flow chart illustrating a field current de-boost scheme of the present invention.

Referring now to step 414 of FIG. 9, once the check function has been defined, $(I_a/I_f)_{CHECK}$ must be compared with the operating ratio value $I_a/I_{f\_SET}$ to determine the value of the de-boosted field current setpoint signal. Specifically, the microprocessor 15 is programmed to determine whether the operating ratio value $I_a/I_{f\_SET}$ is greater than the corresponding ratio value $(I_a/I_f)_{CHECK}$. The outcome of this comparison determines the manner in which the de-boosted field current setpoint signal is calculated. The microprocessor 15 is programmed to establish the magnitude of the field current de-boost signal $I_{f\_DE-BOOST}$ according to a selected one of two distinct de-boost equations, see steps 416 and 418. The identity of the selected equation depends upon the outcome of the comparison of the operating ratio value $I_a/I_{f\_SET}$ to the corresponding armature current to field current ratio value $(I_a/I_f)_{CHECK}$.

The two distinct de-boost equations are as follows:

$$I'_{f\_SET} = \frac{I_a}{(I_a/I_f)_{CHECK}} \quad \text{equation (3)}$$

$$I'_{f\_SET} = I_{f\_SET} - [(I_{a\_ERROR}) \times I_{f\_GAIN}] \quad \text{equation (4)}$$

where $I_{f\_SET}'$ represents the de-boosted field current setpoint signal on line 42 and where $I_{f\_GAIN}$ represents a preselected gain parameter that is selected to optimize performance of the motor control scheme. Typically, $I_{f\_GAIN}$ will range from about 0.1 to about 1.0. The microprocessor is programmed to generate the armature current error signal $I_{a\_ERROR}$ by comparing the armature current setpoint signal $I_{a\_SET}$ and the measured armature current signal $I_a$.

The microprocessor 15 is programmed to select equation (3) when the operating ratio value $I_a/I_{f\_SET}$ is greater than the corresponding armature current to field current ratio value $(I_a/I_f)_{CHECK}$, see steps 414 and 416, and to select equation (4) when the operating ratio value $I_a/I_{f\_SET}$ is not greater than the corresponding armature current to field current ratio value $(I_a/I_f)_{CHECK}$, see steps 414 and 418. In this manner, if $I_a/I_{f\_SET}$ is greater than $(I_a/I_f)_{CHECK}$, the magnitude of $I_{f\_SET}'$ is tied directly to $(I_a/I_f)_{CHECK}$. On the other hand if $I_a/I_{f\_SET}$ is not greater than $(I_a/I_f)_{CHECK}$, the magnitude of $I_{f\_SET}'$, then $I_{f\_SET}'$ is proportional to the armature current error signal $I_{a\_ERROR}$.

Figure 11:
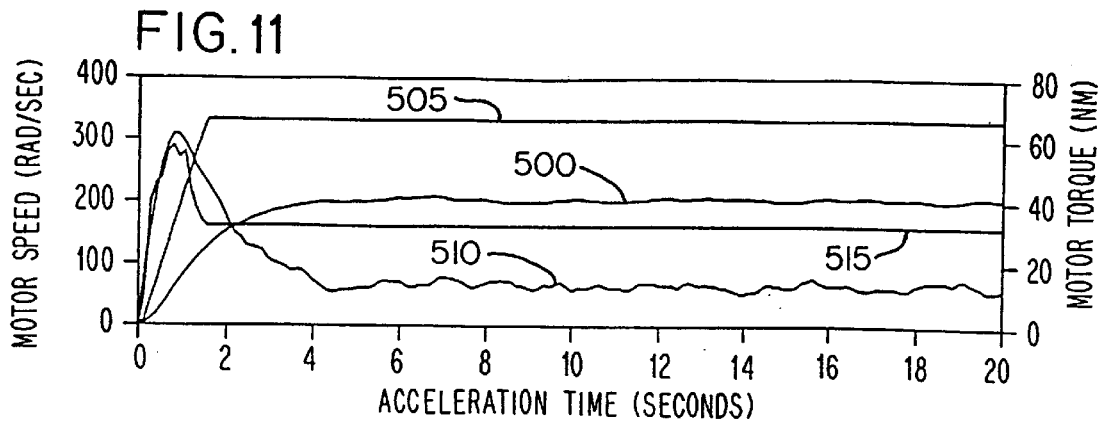
FIG. 11 is a graph illustrating the behavior of motor speed (left y-axis) and torque (right y-axis) as a function of acceleration time, without field current de-boost.
Figure 12:
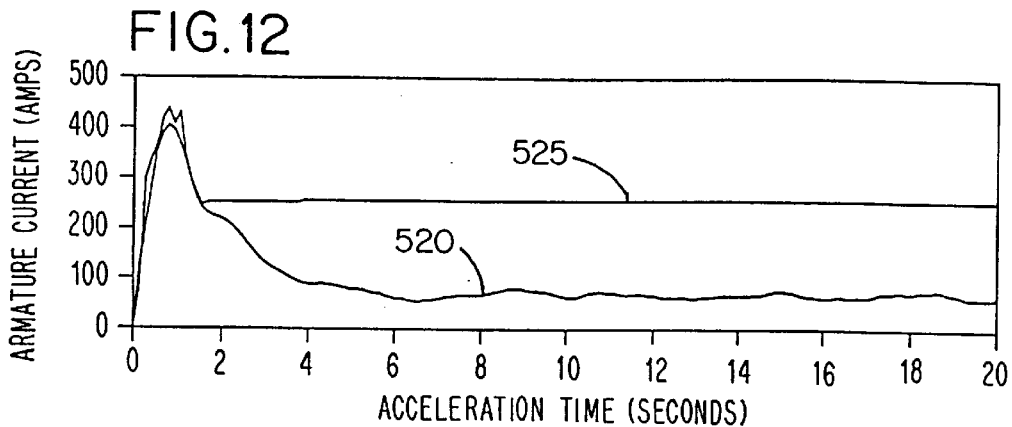
FIG. 12 is a graph illustrating the behavior of armature current as a function of acceleration time, without field current de-boost.
Figure 13:
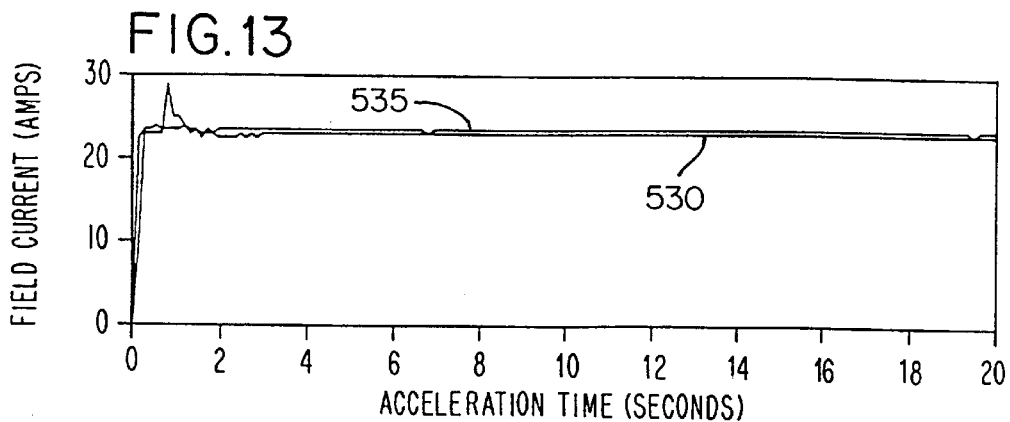
FIG. 13 is a graph illustrating the behavior of field current as a function of acceleration time, without field current de-boost.
Figure 14:
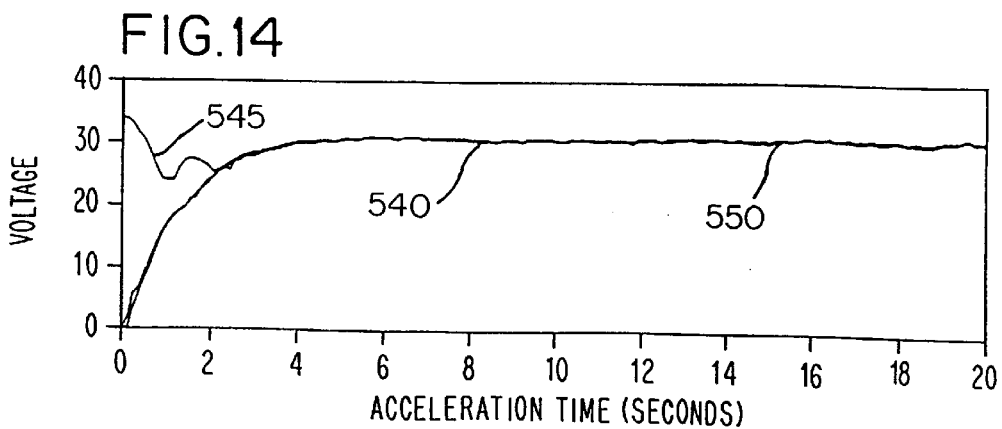
FIG. 14 is a graph illustrating the behavior of armature voltage as a function of acceleration time, without field current de-boost.

FIGS. 11–18 illustrate the effectiveness of the above-described field de-boost control scheme. Specifically, FIGS. 11–14 illustrate speed, torque, armature current, field current, armature voltage, and battery voltage values, over time, as a motor is subject to acceleration without field current de-boost control according to the present invention. Referring to FIG. 11, note that actual speed 500 is significantly lower that the set speed 505 and that actual torque 510 is significantly lower than the set torque 515. Similarly, referring to FIG. 12, note that actual armature current 520 is significantly lower than the armature current set point 525. The field current set point 535 and actual field current 530 are illustrated in FIG. 13. The battery voltage 545, armature voltage 540, and armature voltage setpoint 550 are illustrated in FIG. 14.

Figure 15:
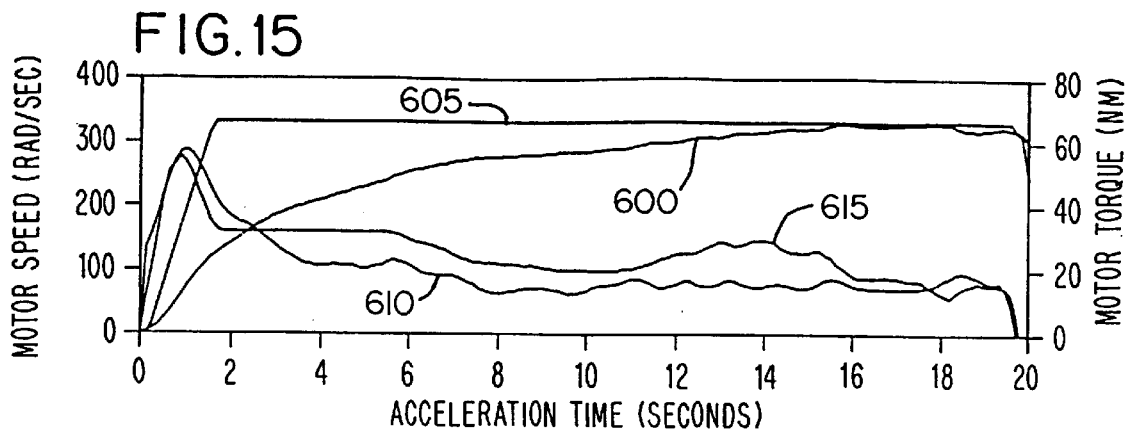
FIG. 15 is a graph illustrating the behavior of motor speed (left y-axis) and torque (right y-axis) as a function of acceleration time, with field current de-boost.
Figure 16:
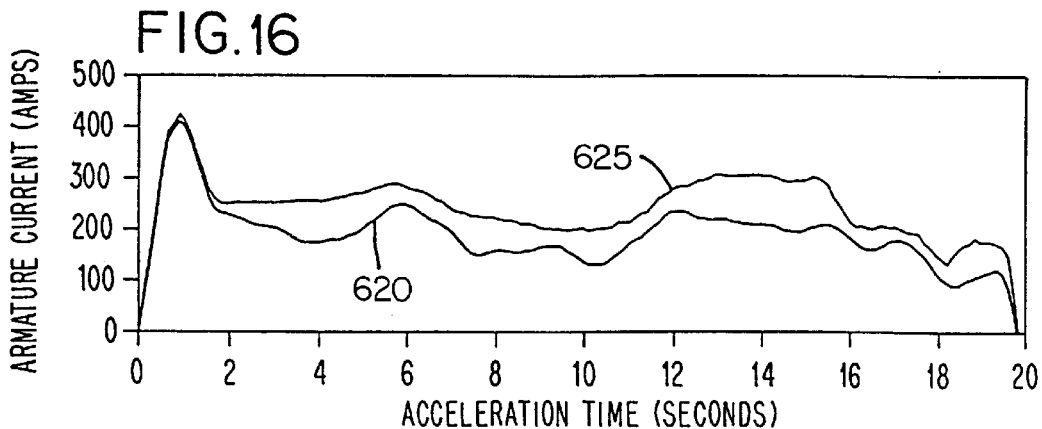
FIG. 16 is a graph illustrating the behavior of armature current as a function of acceleration time, with field current de-boost.
Figure 17:
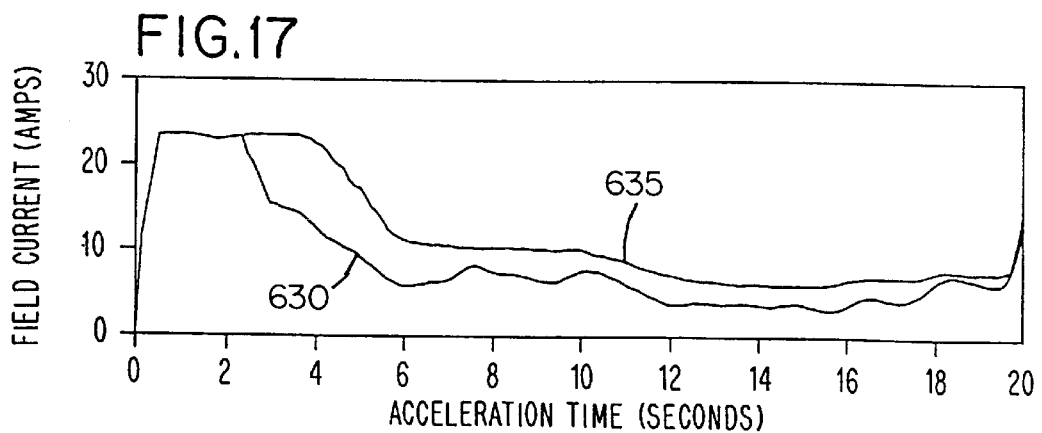
FIG. 17 is a graph illustrating the behavior of field current as a function of acceleration time, with field current de-boost.
Figure 18:
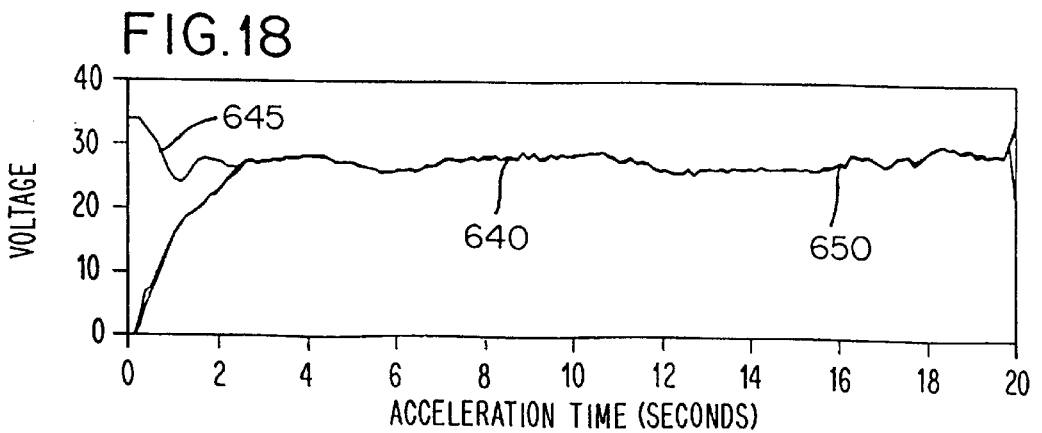
FIG. 18 is a graph illustrating the behavior of armature voltage as a function of acceleration time, with field current de-boost.

In contrast, the values illustrated in FIGS. 15–18 correspond to acceleration executed under the field current de-boost control according to the present invention. Referring initially to FIG. 15, with de-boost control, the actual speed 600 comes much closer to the set speed 605 and reaches a higher maximum value than the actual speed 500 in FIG. 11. Similarly, the actual torque 610 is very close to the set torque 615. FIG. 16 illustrates the close correspondence of the actual armature current 620 and the armature current setpoint 625, particularly when compared with FIG. 12. FIG. 17 illustrates the fact that the actual field current 630 is less than the look-up table field current setpoint 635. FIG. 18 illustrates the fact that battery voltage 645, the actual armature voltage 640, and the armature voltage setpoint 650 each closely correspond to each other.

Look-up Table Construction.

Referring now to FIG. 5, the process by which the values stored in the look-up tables 60 are determined is described in detail. It is contemplated by the present invention, however, that a number of different schemes could be employed to determine preferred values for armature current, field current, and armature voltage setpoints, including schemes that do not utilize any look-up tables. FIG. 5 represents a routine 110 for minimizing armature current. The first step, see block 111, is to specify model parameter files for the desired motor configuration. The second step, see block 112, is to specify battery power constraints, minimum and maximum speed, minimum and maximum torque and look-up table size. The next step, see block 113 is to specify controller hardware current limits and commutation limits. Next, see block 114, limits on field current range based on power envelope and motor parameters are determined.

In block 115, $i_{min}$, $j_{min}$ to $i_{max}$, $j_{max}$ are determined and represent a range of speed and torque setpoints. In block 117, the field excitation current which results in minimum armature current within a given range is determined. The tables are generated based on empirical fit functions to dynamometer data on a limited sampling of a particular motor configuration. Since the tables are constructed based on a defined model, component tolerances, wear, heating, and state of battery charge can contribute to sample-to-sample variances in resultant output horsepower or energy conversion. Commutation voltage is calculated in block 118 and this data is put into matrices, see block 119. The process is then repeated, see block 120 for each element (i, j) in the tables. Finally, the tables are compiled, see block 130, and stored. Thus, the following items are calculated and stored: armature current $I_{arm}$ (i,j); field current $I_{fld}$ (i,j); armature voltage $V_a$ (i,j); calculated torque (i,j); motor efficiency (i,j); and, commutation voltage(i,j).

Table 1 is an example of a look-up table giving the desired armature current $I_a$ for various values of torque T setpoints (left vertical column) and actual speed (top row). Similarly, Table 2 is an example of a look-up table for desired field current $I_f$ at specified torques and speeds. Table 3 is an example of a look-up table that provides expected armature voltages $V_a$ at those specified torques and speeds. Table 4 represents expected torque. The torque value T in newton-meters (Nm) is provided by the speed comparator function 50 of the microprocessor 15 and the actual speed value is provided by the encoder 25. Speed is given in radians/second. In the preferred embodiment of this invention, the torque values in each table are in 5 newton-meter increments and the speed ranges from 0 to 400 radians/second. The data in these specific tables are unique to a given motor configuration or design since they are generated with reference to such factors that include but are not limited to the size, torque, and speed of the motor and internal motor losses. Interpolation may be used to determine values of $I_f$, $I_a$ and $V_a$ for intermediate speed and torque values. It is important to note that, although the following look-up tables are presented in substantial detail, the information embodied therein could be gleaned, through interpolation and routine experimentation, from a significantly abbreviated reproduction of the tables.

TABLE 1

| | $I_{ARM}$ | | | | | | | | | | | | |
|---|---|---|---|---|---|---|---|---|---|---|---|---|---|
| T↓ ω→ | 0 | 16 | 32 | 48 | 64 | 80 | 96 | 112 | 128 | 144 | 160 | 176 | 192 |
| 80 | 560 | 560 | 560 | 560 | 560 | 560 | 560 | 560 | 560 | 560 | 560 | 516 | 438 |
| 75 | 560 | 560 | 560 | 560 | 560 | 560 | 560 | 560 | 560 | 560 | 560 | 516 | 438 |
| 70 | 530 | 533 | 537 | 540 | 542 | 543 | 544 | 545 | 546 | 547 | 549 | 516 | 438 |
| 65 | 493 | 496 | 500 | 503 | 504 | 505 | 507 | 508 | 509 | 510 | 511 | 516 | 438 |
| 60 | 456 | 459 | 462 | 466 | 467 | 468 | 469 | 470 | 471 | 473 | 474 | 484 | 438 |
| 55 | 418 | 422 | 425 | 428 | 430 | 431 | 432 | 433 | 434 | 435 | 436 | 437 | 438 |
| 50 | 381 | 384 | 388 | 391 | 393 | 394 | 395 | 396 | 397 | 398 | 399 | 400 | 413 |
| 45 | 344 | 347 | 350 | 354 | 355 | 356 | 357 | 359 | 360 | 361 | 362 | 363 | 364 |
| 40 | 307 | 310 | 313 | 317 | 318 | 319 | 320 | 321 | 322 | 323 | 323 | 326 | 327 |
| 35 | 269 | 273 | 276 | 279 | 281 | 282 | 283 | 284 | 285 | 286 | 287 | 288 | 289 |
| 30 | 232 | 235 | 239 | 242 | 243 | 245 | 246 | 247 | 248 | 249 | 250 | 251 | 252 |
| 25 | 195 | 198 | 201 | 205 | 206 | 207 | 208 | 209 | 211 | 212 | 213 | 214 | 215 |

TABLE 1-continued

$I_{ARM}$

| | | | | | | | | | | | | | |
|---|---|---|---|---|---|---|---|---|---|---|---|---|---|
| 20 | 158 | 161 | 164 | 167 | 169 | 170 | 171 | 172 | 173 | 174 | 175 | 176 | 178 |
| 15 | 120 | 123 | 127 | 130 | 132 | 133 | 134 | 135 | 136 | 137 | 138 | 139 | 140 |
| 10 | 83 | 86 | 89 | 93 | 94 | 95 | 96 | 98 | 99 | 100 | 101 | 102 | 103 |
| 5 | 46 | 49 | 52 | 56 | 57 | 58 | 59 | 60 | 61 | 62 | 64 | 65 | 66 |
| 0 | 8 | 12 | 15 | 19 | 20 | 21 | 22 | 23 | 24 | 25 | 26 | 28 | 29 |
| T↕ ω↔ | 208 | 224 | 240 | 256 | 272 | 288 | 304 | 320 | 336 | 352 | 368 | 384 | 400 |
| 40 | 392 | 362 | 344 | 331 | 323 | 317 | 312 | 306 | 299 | 293 | | | |
| 37.5 | | 341 | 344 | 331 | 323 | 317 | 312 | 306 | 299 | 293 | | | |
| 35 | 392 | 313 | 341 | 331 | 323 | 317 | 312 | 306 | 299 | 293 | | | |
| 32.5 | | 287 | 309 | 331 | 323 | 317 | 312 | 306 | 299 | 293 | | | |
| 30 | 392 | 262 | 281 | 303 | 323 | 317 | 312 | 306 | 299 | 293 | | | |
| 27.5 | | 239 | 256 | 273 | 293 | 314 | 312 | 306 | 299 | 293 | | | |
| 25 | 392 | 217 | 232 | 245 | 262 | 280 | 299 | 306 | 299 | 293 | | | |
| 22.5 | | 198 | 207 | 219 | 233 | 248 | 263 | 280 | 297 | 293 | | | |
| 20 | 339 | 180 | 186 | 194 | 206 | 218 | 231 | 244 | 258 | 273 | 287 | 283 | 283 |
| 17.5 | | 161 | 164 | 171 | 180 | 190 | 200 | 211 | 223 | 235 | 247 | 260 | 274 |
| 15 | 253 | 142 | 143 | 149 | 156 | 163 | 171 | 190 | 189 | 199 | 209 | 219 | 229 |
| 12.5 | | 124 | 125 | 128 | 133 | 138 | 144 | 151 | 158 | 166 | 173 | 181 | 189 |
| 10 | 179 | 105 | 106 | 108 | 111 | 115 | 119 | 124 | 129 | 134 | 140 | 146 | 152 |
| 7.5 | | 96 | 87 | 89 | 91 | 92 | 96 | 98 | 102 | 106 | 109 | 113 | 118 |
| 5 | 104 | 67 | 68 | 69 | 70 | 71 | 72 | 74 | 78 | 78 | 90 | 93 | 85 |
| 2.5 | | 47 | 48 | 49 | 49 | 49 | 50 | 50 | 51 | 62 | 53 | 54 | 55 |
| 0 | 30 | 31 | 32 | 33 | 34 | 35 | 36 | 37 | 38 | 39 | 40 | 42 | 43 |
| T↕ ω↔ | 0 | 16 | 32 | 48 | 64 | 80 | 96 | 112 | 128 | 144 | 160 | 176 | 192 |
| −5 | 56 | 48 | 45 | −44 | −44 | −45 | −46 | −47 | −48 | −49 | −50 | −51 | −52 |
| −10 | 97 | 87 | 85 | −80 | −81 | −81 | −82 | −83 | −84 | −85 | −86 | −87 | −88 |
| −15 | 136 | 126 | 124 | −117 | −116 | −116 | −117 | −117 | −118 | −118 | −119 | −121 | −122 |
| −20 | 174 | 164 | 162 | −151 | −151 | −151 | −150 | −149 | −149 | −152 | −152 | −153 | −153 |
| −25 | 210 | 200 | 198 | 195 | −179 | −178 | −181 | −180 | −181 | −181 | −182 | −183 | −184 |
| −30 | 244 | 234 | 232 | 230 | −211 | −210 | −209 | −208 | −209 | −208 | −209 | −209 | −208 |
| −35 | 277 | 266 | 263 | 259 | −245 | −244 | −242 | −241 | −240 | −240 | −240 | −240 | −239 |
| −40 | 309 | 298 | 295 | 293 | −280 | −279 | −278 | −277 | −276 | −275 | −274 | −273 | −273 |
| −45 | 343 | 333 | 330 | 327 | −317 | −316 | −315 | −314 | −314 | −313 | −312 | −310 | −309 |
| −50 | 379 | 369 | 365 | 362 | −354 | −353 | −352 | −351 | −350 | −349 | −347 | −346 | −345 |
| −55 | 414 | 403 | 400 | 397 | −391 | −390 | −389 | −388 | −387 | −386 | −385 | −384 | −383 |
| −60 | 451 | 441 | 438 | 434 | −428 | −427 | −426 | −425 | −424 | −423 | −422 | −421 | −420 |
| −65 | 487 | 476 | 473 | 469 | 468 | −464 | −463 | −462 | −461 | −460 | −459 | −458 | −457 |
| −70 | 524 | 513 | 510 | 507 | 505 | −502 | −501 | −500 | −498 | −497 | −496 | −495 | −494 |
| −75 | 560 | 551 | 547 | 544 | 543 | −539 | −538 | −537 | −536 | −535 | −534 | −533 | −531 |
| −80 | 560 | 560 | 560 | 560 | 560 | −560 | −560 | −560 | −560 | −560 | −560 | −560 | −532 |
| T↕ ω↔ | 208 | 224 | 240 | 256 | 272 | 288 | 304 | 320 | 336 | 352 | 368 | 384 | 409 |
| −5 | −53 | −54 | −55 | −56 | −57 | −58 | −59 | −60 | −61 | −62 | −63 | −63 | −64 |
| −10 | −90 | −91 | −92 | −93 | −95 | −96 | −97 | −98 | −100 | −101 | −102 | −103 | −104 |
| −15 | −123 | −122 | −124 | −126 | −127 | −129 | −130 | −131 | −133 | −135 | −135 | −137 | −138 |
| −20 | −154 | −155 | −156 | −157 | −158 | −160 | −161 | −162 | −164 | −167 | −167 | −169 |  |
| −25 | −185 | −185 | −186 | −186 | −188 | −190 | −191 | −192 | −193 | −195 | −195 | −197 | −177 |
| −30 | −211 | −210 | −209 | −215 | −216 | −218 | −219 | −221 | −221 | −223 | −220 | −199 | −177 |
| −35 | −239 | −239 | −239 | −240 | −241 | −242 | −241 | −244 | −244 | −242 | −220 | −199 | −177 |
| −40 | −273 | −272 | −271 | −270 | −271 | −271 | −270 | −272 | −260 | −242 | −220 | −199 | −177 |
| −45 | −308 | −307 | −306 | −305 | −304 | −303 | −302 | −283 | −260 | −242 | −220 | −199 | −177 |
| −50 | −344 | −343 | −342 | −341 | −340 | −340 | −310 | −283 | −260 | −242 | −220 | −199 | −177 |
| −55 | −382 | −381 | −380 | −378 | −372 | −341 | −310 | −283 | −260 | −242 | −220 | −199 | −177 |
| −60 | −419 | −418 | −417 | −404 | −372 | −341 | −310 | −283 | −260 | −242 | −220 | −199 | −177 |
| −65 | −456 | −455 | −436 | −404 | −372 | −341 | −310 | −283 | −260 | −242 | −220 | −199 | −177 |
| −70 | −493 | −468 | −436 | −404 | −372 | −341 | −310 | −283 | −260 | −242 | −220 | −199 | −177 |
| −75 | −500 | −468 | −436 | −404 | −372 | −341 | −310 | −283 | −260 | −242 | −220 | −199 | −177 |
| −80 | −500 | −468 | −436 | −404 | −372 | −341 | −310 | −283 | −260 | −242 | −220 | −199 | −177 |

TABLE 2

$I_{FIELD}$

| T↕ ω↔ | 0 | 16 | 32 | 48 | 64 | 80 | 96 | 112 | 128 | 144 | 160 | 176 | 192 |
|---|---|---|---|---|---|---|---|---|---|---|---|---|---|
| 80 | 50.0 | 50.0 | 23.6 | 23.9 | 24.0 | 29.8 | 24.2 | 24.1 | 24.0 | 24.2 | 21.4 | 18.1 | 18.0 |
| 75 | 50.0 | 50.0 | 23.6 | 23.9 | 24.0 | 29.8 | 24.2 | 24.1 | 24.0 | 24.2 | 21.4 | 18.1 | 18.0 |
| 70 | 23.8 | 24.2 | 23.5 | 23.8 | 23.4 | 23.4 | 23.5 | 23.5 | 23.6 | 23.7 | 23.2 | 18.1 | 18.0 |
| 65 | 23.6 | 23.7 | 23.4 | 23.5 | 23.9 | 24.2 | 23.3 | 23.4 | 23.4 | 23.4 | 23.5 | 18.1 | 18.0 |

TABLE 2-continued $I_{FIELD}$

| | | | | | | | | | | | | |
|---|---|---|---|---|---|---|---|---|---|---|---|---|
| 60 | 23.4 | 23.5 | 23.8 | 23.4 | 23.6 | 23.7 | 23.8 | 23.9 | 24.2 | 23.3 | 23.3 | 20.8 | 18.0 |
| 55 | 24.2 | 23.3 | 23.5 | 23.9 | 23.4 | 23.4 | 23.5 | 23.5 | 23.6 | 23.7 | 23.8 | 23.9 | 18.0 |
| 50 | 23.6 | 23.8 | 23.3 | 23.5 | 23.2 | 23.2 | 23.3 | 23.4 | 23.4 | 23.4 | 23.5 | 23.5 | 19.8 |
| 45 | 23.4 | 23.5 | 24.0 | 23.3 | 23.6 | 23.8 | 24.0 | 23.1 | 23.2 | 23.2 | 23.3 | 23.3 | 23.3 |
| 40 | 23.1 | 23.3 | 23.5 | 23.1 | 23.4 | 23.4 | 23.5 | 23.6 | 23.7 | 23.9 | 23.0 | 23.0 | 23.1 |
| 35 | 23.7 | 29.0 | 23.3 | 23.6 | 23.1 | 23.1 | 23.2 | 23.3 | 23.4 | 23.4 | 23.5 | 23.6 | 23.7 |
| 30 | 23.3 | 23.5 | 22.9 | 23.3 | 23.8 | 22.8 | 22.8 | 22.9 | 23.0 | 23.1 | 23.1 | 23.2 | 23.3 |
| 25 | 23.0 | 23.1 | 23.6 | 22.8 | 23.3 | 23.4 | 23.5 | 23.8 | 22.6 | 22.6 | 22.7 | 22.7 | 22.8 |
| 20 | 22.5 | 22.7 | 23.1 | 23.8 | 22.8 | 22.9 | 23.0 | 23.2 | 23.3 | 23.4 | 23.5 | 23.8 | 22.2 |
| 15 | 23.2 | 23.5 | 22.5 | 23.0 | 22.2 | 22.3 | 22.4 | 22.5 | 22.5 | 22.6 | 22.7 | 22.8 | 22.9 |
| 10 | 22.4 | 22.7 | 23.9 | 22.2 | 23.0 | 23.3 | 23.8 | 21.3 | 21.3 | 21.4 | 21.4 | 21.4 | 21.4 |
| 5 | 20.8 | 21.1 | 22.2 | 20.3 | 21.1 | 21.2 | 21.4 | 21.6 | 21.8 | 22.4 | 16.0 | 15.3 | 14.4 |
| 0 | 3.6 | 4.3 | 5.9 | 5.8 | 5.6 | 5.1 | 4.7 | 4.3 | 4.1 | 3.8 | 3.6 | 3.2 | 3.1 |

| T: ω↔ | 208 | 224 | 240 | 256 | 272 | 288 | 304 | 320 | 336 | 352 | 368 | 384 | 400 |
|---|---|---|---|---|---|---|---|---|---|---|---|---|---|
| 40 | 15.6 | 13.2 | 10.9 | 9.3 | 8.1 | 7.2 | 6.4 | 5.0 | 5.5 | 5.1 | | | |
| 375 | | 14.2 | 10.9 | 9.3 | 8.1 | 7.2 | 6.4 | 5.0 | 5.5 | 5.1 | | | |
| 35 | 15.6 | 15.8 | 10.9 | 9.3 | 8.1 | 7.2 | 6.4 | 5.0 | 5.5 | 5.1 | | | |
| 32.5 | | 17.8 | 12.3 | 9.3 | 8.1 | 7.2 | 6.4 | 5.0 | 5.5 | 5.1 | | | |
| 30 | 15.6 | 19.1 | 19.8 | 10.1 | 8.1 | 7.2 | 6.4 | 5.0 | 5.5 | 5.1 | | | |
| 27.5 | | 20.7 | 14.6 | 11.0 | 8.8 | 7.2 | 6.4 | 5.0 | 5.5 | 5.1 | | | |
| 25 | 15.6 | 22.9 | 15.7 | 12.1 | 9.4 | 7.7 | 6.6 | 5.0 | 5.5 | 5.1 | | | |
| 22.5 | | 23.4 | 17.8 | 13.3 | 10.2 | 8.3 | 7.1 | 6.2 | 5.5 | 5.1 | | | |
| 20 | 19.2 | 22.2 | 18.5 | 14.8 | 11.1 | 8.9 | 7.6 | 6.6 | 5.9 | 5.3 | 4.8 | 4.5 | 4.2 |
| 17.5 | | 22.6 | 20.2 | 15.8 | 12.1 | 9.7 | 8.1 | 7.0 | 6.2 | 6.6 | 5.1 | 4.7 | 4.3 |
| 15 | 23.3 | 23.2 | 23.4 | 17.0 | 13.0 | 10.5 | 8.8 | 7.5 | 6.7 | 5.9 | 5.4 | 4.9 | 4.6 |
| 12.5 | | 21.3 | 21.2 | 18.0 | 13.0 | 11.4 | 9.5 | 8.0 | 7.1 | 6.3 | 5.7 | 5.2 | 4.9 |
| 10 | 22.2 | 21.3 | 21.2 | 18.4 | 14.8 | 11.8 | 10.0 | 8.5 | 7.6 | 6.7 | 6.1 | 5.5 | 5.1 |
| 7.5 | | 21.6 | 21.3 | 15.0 | 13.4 | 12.9 | 10.5 | 9.1 | 7.8 | 7.1 | 6.4 | 5.9 | 5.4 |
| 5 | 21.3 | 16.3 | 14.7 | 13.4 | 12.4 | 11.4 | 10.7 | 9.0 | 8.0 | 7.3 | 6.8 | 6.1 | 5.7 |
| 2.5 | | 17.9 | 18.7 | 19.0 | 8.5 | 13.7 | 8.2 | 9.0 | 7.0 | 7.2 | 6.7 | 6.3 | 6.0 |
| 0 | 3.0 | 2.8 | 2.7 | 2.6 | 2.6 | 2.5 | 2.4 | 2.3 | 2.3 | 2.2 | 2.1 | 2.0 | 2.0 |

| T: ω↔ | 0 | 16 | 32 | 48 | 64 | 80 | 96 | 112 | 128 | 144 | 160 | 176 | 192 |
|---|---|---|---|---|---|---|---|---|---|---|---|---|---|
| −5 | −6.3 | −5.6 | −5.4 | 5.0 | 4.9 | 4.7 | 4.5 | 4.4 | 4.2 | 4.1 | 4.0 | 3.9 | 3.8 |
| −10 | −8.8 | −8.7 | −8.2 | 8.6 | 8.2 | 8.1 | 7.8 | 7.5 | 7.3 | 7.1 | 6.9 | 6.7 | 6.5 |
| −15 | −10.8 | −10.6 | −10.3 | 11.3 | 11.3 | 11.0 | 10.7 | 10.5 | 10.2 | 10.0 | 9.7 | 9.4 | 9.0 |
| −20 | −12.5 | −12.3 | −12.0 | 14.2 | 13.9 | 13.8 | 13.8 | 13.8 | 13.5 | 12.7 | 12.5 | 12.2 | 11.9 |
| −25 | −14.4 | −14.0 | −13.8 | −13.8 | 18.1 | 18.1 | 16.9 | 16.9 | 16.5 | 16.1 | 15.6 | 15.1 | 14.6 |
| −30 | −16.3 | −16.0 | −15.7 | −15.3 | 20.6 | 20.6 | 20.6 | 20.5 | 20.1 | 19.9 | 19.5 | 19.1 | 19.1 |
| −35 | −18.1 | −18.1 | −18.1 | −18.1 | 22.1 | 22.1 | 22.1 | 22.1 | 22.1 | 21.8 | 21.3 | 21.3 | 21.3 |
| −40 | −19.9 | −19.9 | −19.9 | −19.6 | 22.8 | 22.8 | 22.8 | 22.8 | 22.8 | 22.8 | 22.8 | 22.8 | 22.4 |
| −45 | −21.0 | −20.8 | −20.6 | −20.6 | 23.5 | 23.4 | 23.2 | 23.0 | 22.8 | 22.8 | 22.8 | 22.8 | 22.8 |
| −50 | −21.3 | −21.3 | −21.3 | −21.3 | 23.5 | 23.5 | 23.5 | 23.5 | 23.5 | 23.5 | 23.5 | 23.5 | 23.5 |
| −55 | −22.1 | −22.1 | −22.1 | −22.1 | 23.5 | 23.5 | 23.5 | 23.5 | 23.5 | 23.5 | 23.5 | 23.5 | 23.5 |
| −60 | −22.3 | −22.1 | −22.1 | −22.1 | 23.9 | 23.9 | 23.9 | 23.9 | 23.9 | 23.9 | 23.7 | 23.5 | 23.5 |
| −65 | −22.8 | −22.8 | −22.8 | −22.8 | −22.8 | 23.9 | 23.9 | 23.9 | 23.9 | 23.9 | 23.9 | 23.9 | 23.9 |
| −70 | −22.8 | −22.8 | −22.8 | −22.8 | −22.8 | 23.9 | 23.9 | 23.9 | 23.9 | 23.9 | 23.9 | 23.9 | 23.9 |
| −75 | −22.8 | −22.8 | −22.8 | −22.8 | −22.8 | 23.9 | 23.9 | 23.9 | 23.9 | 23.9 | 23.9 | 23.9 | 23.9 |
| −80 | −23.5 | −23.5 | −23.5 | −23.5 | −23.5 | 23.9 | 23.9 | 23.9 | 23.9 | 23.9 | 23.9 | 23.9 | 23.9 |

| T: ω↔ | 208 | 224 | 240 | 256 | 272 | 288 | 304 | 320 | 336 | 352 | 368 | 384 | 400 |
|---|---|---|---|---|---|---|---|---|---|---|---|---|---|
| −5 | 3.7 | 3.6 | 3.5 | 3.4 | 3.3 | 3.3 | 3.2 | 3.1 | 3.1 | 3.0 | 3.0 | 3.0 | 2.9 |
| −10 | 6.3 | 6.1 | 6.0 | 5.8 | 5.6 | 5.5 | 5.4 | 5.3 | 5.2 | 5.1 | 4.0 | 4.9 | 4.8 |
| −15 | 8.8 | 8.7 | 8.5 | 8.2 | 8.0 | 7.7 | 7.5 | 7.4 | 7.2 | 7.0 | 6.9 | 6.7 | 6.6 |
| −20 | 11.5 | 11.3 | 11.1 | 10.7 | 10.4 | 10.1 | 9.9 | 9.6 | 9.3 | 9.0 | 8.8 | 8.7 | 8.5 |
| −25 | 14.4 | 14.1 | 13.8 | 13.7 | 13.0 | 12.6 | 12.4 | 12.0 | 11.7 | 11.3 | 11.2 | 10.9 | 8.8 |
| −30 | 18.1 | 18.1 | 18.1 | 16.6 | 16.1 | 15.6 | 15.1 | 14.6 | 14.4 | 13.9 | 13.5 | 11.0 | 8.8 |
| −35 | 21.0 | 20.6 | 20.4 | 19.9 | 19.5 | 19.1 | 19.1 | 18.1 | 18.1 | 16.1 | 13.5 | 11.0 | 8.8 |
| −40 | 22.1 | 22.1 | 22.1 | 22.1 | 21.6 | 21.3 | 21.3 | 20.6 | 19.2 | 16.1 | 13.5 | 11.0 | 8.8 |
| −45 | 22.8 | 22.8 | 22.8 | 22.8 | 22.8 | 22.8 | 22.7 | 21.3 | 19.2 | 16.1 | 13.5 | 11.0 | 8.8 |
| −50 | 23.5 | 23.5 | 23.5 | 23.5 | 23.5 | 23.2 | 22.8 | 21.3 | 19.2 | 16.1 | 13.5 | 11.0 | 8.8 |
| −55 | 23.5 | 23.5 | 23.5 | 23.5 | 23.5 | 23.4 | 22.8 | 21.3 | 19.2 | 16.1 | 13.5 | 11.0 | 8.8 |
| −60 | 23.5 | 23.5 | 23.5 | 23.5 | 23.5 | 23.4 | 22.8 | 21.3 | 19.2 | 16.1 | 13.5 | 11.0 | 8.8 |
| −65 | 23.9 | 23.9 | 23.9 | 23.5 | 23.5 | 23.4 | 22.8 | 21.3 | 19.2 | 16.1 | 13.5 | 11.0 | 8.8 |
| −70 | 23.9 | 23.9 | 23.9 | 23.5 | 23.5 | 23.4 | 22.8 | 21.3 | 19.2 | 16.1 | 13.5 | 11.0 | 8.8 |
| −75 | 23.9 | 23.9 | 23.9 | 23.5 | 23.5 | 23.4 | 22.8 | 21.3 | 19.2 | 16.1 | 13.5 | 11.0 | 8.8 |
| −80 | 23.9 | 23.9 | 23.9 | 23.5 | 23.5 | 23.4 | 22.8 | 21.3 | 19.2 | 16.1 | 13.5 | 11.0 | 8.8 |

TABLE 3

| T↕ ω↔ | \>V_A\> 0 | 16 | 132 | 48 | 64 | 80 | 96 | 112 | 128 | 144 | 160 | 176 | 192 |
|---|---|---|---|---|---|---|---|---|---|---|---|---|---|
| 80 | 7.8 | 9.8 | 11.9 | 14.1 | 16.2 | 18.3 | 20.5 | 22.6 | 24.8 | 26.9 | 28.7 | 29.4 | 30.6 |
| 75 | 7.8 | 9.8 | 11.9 | 14.1 | 16.2 | 18.3 | 20.5 | 22.6 | 24.8 | 26.9 | 28.7 | 29.4 | 30.6 |
| 70 | 7.4 | 9.5 | 11.7 | 13.8 | 16.0 | 18.1 | 20.3 | 22.5 | 24.6 | 26.8 | 28.9 | 29.4 | 30.6 |
| 65 | 7.1 | 9.1 | 11.3 | 13.4 | 15.6 | 17.8 | 19.9 | 22.1 | 24.2 | 26.4 | 28.5 | 29.4 | 30.6 |
| 60 | 6.7 | 8.7 | 10.9 | 13.1 | 15.2 | 17.4 | 19.5 | 21.7 | 23.9 | 26.0 | 28.1 | 29.9 | 30.6 |
| 55 | 6.3 | 8.3 | 10.5 | 12.7 | 14.8 | 17.0 | 19.2 | 21.3 | 23.5 | 25.6 | 27.8 | 30.0 | 30.6 |
| 50 | 5.9 | 8.0 | 10.1 | 12.3 | 14.5 | 16.6 | 18.8 | 20.9 | 23.1 | 25.2 | 27.4 | 29.6 | 30.9 |
| 45 | 5.5 | 7.6 | 9.8 | 11.9 | 14.1 | 16.2 | 18.4 | 20.5 | 22.7 | 24.8 | 27.0 | 29.2 | 31.3 |
| 40 | 5.1 | 7.2 | 9.3 | 11.5 | 13.7 | 15.8 | 18.0 | 20.2 | 22.3 | 24.5 | 26.6 | 28.7 | 30.9 |
| 35 | 4.7 | 6.7 | 8.9 | 11.1 | 13.2 | 15.4 | 17.6 | 19.7 | 21.9 | 24.0 | 26.2 | 28.4 | 30.5 |
| 30 | 4.2 | 6.3 | 8.5 | 10.6 | 12.8 | 14.9 | 17.1 | 19.2 | 21.4 | 23.6 | 25.7 | 27.9 | 30.0 |
| 25 | 3.7 | 5.8 | 8.0 | 10.1 | 12.3 | 14.5 | 16.6 | 18.8 | 20.9 | 23.0 | 25.2 | 27.3 | 29.5 |
| 20 | 3.2 | 5.2 | 7.4 | 9.6 | 11.8 | 13.9 | 16.1 | 18.2 | 20.4 | 22.6 | 24.8 | 26.9 | 28.9 |
| 15 | 2.6 | 4.7 | 6.8 | 9.0 | 11.2 | 13.3 | 15.5 | 17.6 | 19.8 | 21.9 | 24.1 | 26.3 | 28.4 |
| 10 | 2.0 | 4.0 | 6.2 | 8.4 | 10.6 | 12.7 | 14.9 | 16.8 | 19.0 | 21.1 | 23.2 | 25.4 | 27.5 |
| 5 | 1.3 | 3.3 | 5.5 | 7.6 | 9.7 | 11.9 | 14.0 | 16.2 | 18.4 | 20.6 | 21.1 | 22.8 | 24.4 |
| 0 | 0.0 | 1.6 | 3.2 | 4.7 | 6.0 | 6.9 | 7.8 | 8.6 | 9.4 | 100 | 10.6 | 10.7 | 11.2 |

| T↕ ω↔ | 208 | 224 | 240 | 256 | 272 | 288 | 304 | 320 | 336 | 352 | 368 | 384 | 400 |
|---|---|---|---|---|---|---|---|---|---|---|---|---|---|
| 40 | 31.2 | 31.7 | 31.9 | 32.2 | 32.3 | 32.4 | 32.4 | 32.5 | 32.6 | 32.7 | | | |
| 37.5 | | 32.0 | 31.9 | 32.2 | 32.3 | 32.4 | 32.4 | 32.5 | 32.6 | 32.7 | | | |
| 35 | 31.2 | 32.4 | 31.9 | 32.2 | 32.3 | 32.4 | 32.4 | 32.5 | 32.6 | 32.7 | | | |
| 32.5 | | 32.8 | 32.5 | 32.2 | 32.3 | 32.4 | 32.4 | 32.5 | 32.6 | 32.7 | | | |
| 30 | 31.2 | 33.2 | 32.9 | 32.6 | 32.3 | 32.4 | 32.4 | 32.6 | 32.6 | 32.7 | | | |
| 27.5 | | 33.6 | 33.1 | 33.0 | 32.7 | 32.4 | 32.4 | 32.5 | 32.6 | 32.7 | | | |
| 25 | 31.2 | 33.8 | 33.3 | 33.4 | 33.1 | 32.9 | 32.6 | 32.5 | 32.6 | 32.7 | | | |
| 22.5 | | 33.6 | 33.9 | 33.8 | 33.6 | 33.3 | 33.2 | 32.9 | 32.7 | 32.7 | | | |
| 20 | 32.0 | 33.2 | 33.9 | 34.2 | 33.9 | 33.8 | 33.8 | 33.4 | 33.3 | 33.0 | 32.8 | 32.9 | 32.8 |
| 17.5 | | 33.0 | 34.4 | 34.5 | 34.3 | 34.1 | 34.1 | 33.9 | 33.7 | 33.5 | 33.4 | 33.2 | 33.0 |
| 15 | 32.2 | 32.8 | 35.0 | 34.7 | 34.8 | 34.6 | 34.6 | 34.4 | 34.3 | 34.1 | 33.9 | 33.8 | 33.7 |
| 12.5 | | 32.0 | 34.1 | 34.9 | 34.8 | 35.0 | 34.8 | 34.7 | 34.5 | 34.5 | 34.4 | 34.3 | |
| 10 | 31.0 | 31.7 | 33.8 | 34.7 | 35.0 | 35.0 | 25.2 | 35.1 | 35.1 | 35.1 | 35.0 | 34.9 | 34.8 |
| 7.5 | | 31.5 | 33.6 | 33.2 | 33.8 | 35.3 | 35.3 | 35.4 | 35.2 | 35.5 | 35.4 | 34.4 | 35.1 |
| 5 | 29.6 | 29.1 | 30.3 | 31.6 | 32.7 | 33.9 | 35.0 | 35.0 | 35.1 | 35.4 | 35.7 | 35.5 | 35.8 |
| 2.5 | | 29.3 | 31.6 | 33.9 | 28.8 | 35.1 | 31.7 | 34.4 | 34.4 | 34.7 | 35.1 | 35.5 | 36.0 |
| 0 | 11.7 | 12.1 | 12.6 | 13.0 | 13.3 | 13.7 | 14.0 | 14.3 | 14.6 | 14.9 | 15.2 | 15.0 | 15.3 |

| T↕ ω↔ | 0 | 16 | 32 | 48 | 64 | 80 | 96 | 112 | 128 | 144 | 160 | 176 | 192 |
|---|---|---|---|---|---|---|---|---|---|---|---|---|---|
| −5 | 1.3 | −0.2 | −1.5 | 4.1 | 5.3 | 6.4 | 7.4 | 8.5 | 9.4 | 10.3 | 11.2 | 12.0 | 12.8 |
| −10 | 2.1 | 0.2 | −1.4 | 5.8 | 7.3 | 8.9 | 10.4 | 11.8 | 13.2 | 14.5 | 15.9 | 17.2 | 18.4 |
| −15 | 2.7 | 0.8 | −0.9 | 6.9 | 8.7 | 10.4 | 12.1 | 13.8 | 15.4 | 17.0 | 18.6 | 20.1 | 21.6 |
| −20 | 3.3 | 1.3 | −0.5 | 7.9 | 9.7 | 11.6 | 13.5 | 15.4 | 17.2 | 18.8 | 20.6 | 22.3 | 24.0 |
| −25 | 3.8 | 1.8 | −0.1 | −2.1 | 10.9 | 12.9 | 14.8 | 16.7 | 18.6 | 20.5 | 22.3 | 24.1 | 25.9 |
| −30 | 4.2 | 2.2 | 0.2 | −1.7 | 11.9 | 14.0 | 16.0 | 18.1 | 20.1 | 22.1 | 24.1 | 26.0 | 28.1 |
| −35 | 4.6 | 2.5 | 0.4 | −1.6 | 12.9 | 15.0 | 17.1 | 19.2 | 21.3 | 23.4 | 25.4 | 27.5 | 29.6 |
| −40 | 5.0 | 2.8 | 0.7 | −1.4 | 14.0 | 16.1 | 18.2 | 20.3 | 22.4 | 24.5 | 26.7 | 28.8 | 30.8 |
| −45 | 5.4 | 3.2 | 1.1 | −1.1 | 15.2 | 17.4 | 18.5 | 21.6 | 23.7 | 25.8 | 27.9 | 30.0 | 32.1 |
| −50 | 5.8 | 3.5 | 4.4 | −0.7 | 16.6 | 18.7 | 20.8 | 22.9 | 25.0 | 27.1 | 29.2 | 31.3 | 33.4 |
| −55 | 6.1 | 3.9 | 1.7 | −0.4 | 18.1 | 20.2 | 22.3 | 24.4 | 26.5 | 28.6 | 30.7 | 32.8 | 34.9 |
| −60 | 6.5 | 4.3 | 2.1 | −0.1 | 19.7 | 21.8 | 23.9 | 26.0 | 28.1 | 30.2 | 32.3 | 34.4 | 36.5 |
| −65 | 6.8 | 4.6 | 2.4 | 0.3 | −1.9 | 23.6 | 25.6 | 27.7 | 29.8 | 31.9 | 34.0 | 36.1 | 38.2 |
| −70 | 7.2 | 5.0 | 2.8 | 0.6 | −1.5 | 25.5 | 27.6 | 29.6 | 31.7 | 33.8 | 35.9 | 38.0 | 40.1 |
| −75 | 7.6 | 5.4 | 3.2 | 1.0 | −1.1 | 27.6 | 29.6 | 31.7 | 33.8 | 35.9 | 38.0 | 40.1 | 42.1 |
| −80 | 8.0 | 5.8 | 3.6 | 1.4 | −0.8 | 29.8 | 31.9 | 34.0 | 36.0 | 38.1 | 40.2 | 41.9 | 42.1 |

| T↕ ω↔ | 208 | 224 | 240 | 256 | 272 | 288 | 304 | 320 | 336 | 352 | 368 | 384 | 400 |
|---|---|---|---|---|---|---|---|---|---|---|---|---|---|
| −5 | 13.6 | 14.3 | 15.0 | 15.7 | 16.4 | 17.1 | 17.7 | 18.4 | 19.1 | 19.7 | 20.3 | 20.9 | 21.4 |
| −10 | 19.6 | 20.8 | 21.9 | 23.0 | 24.0 | 25.2 | 26.2 | 27.1 | 28.1 | 29.0 | 30.1 | 31.0 | 31.9 |
| −15 | 23.1 | 24.7 | 26.0 | 27.3 | 28.7 | 30.0 | 31.2 | 32.5 | 33.7 | 34.8 | 36.1 | 37.2 | 38.3 |
| −20 | 25.6 | 27.3 | 28.9 | 30.4 | 32.0 | 33.4 | 35.0 | 36.4 | 37.7 | 39.1 | 40.4 | 42.0 | 43.2 |
| −25 | 27.7 | 29.5 | 31.3 | 33.1 | 34.6 | 36.2 | 37.9 | 39.4 | 41.0 | 42.5 | 44.2 | 45.6 | 45.0 |
| −30 | 29.8 | 31.8 | 33.9 | 35.3 | 37.0 | 38.7 | 40.4 | 42.1 | 43.9 | 45.5 | 47.0 | 45.8 | 44.0 |
| −35 | 31.6 | 33.5 | 35.6 | 37.4 | 39.4 | 41.2 | 43.3 | 44.9 | 46.9 | 47.5 | 47.0 | 45.8 | 44.0 |
| −40 | 32.9 | 35.0 | 37.1 | 39.1 | 41.1 | 43.1 | 45.2 | 47.0 | 48.0 | 47.5 | 47.0 | 45.8 | 44.0 |
| −45 | 34.2 | 36.3 | 38.4 | 40.5 | 42.6 | 44.7 | 46.8 | 47.7 | 48.0 | 47.5 | 47.0 | 45.8 | 44.0 |
| −50 | 35.5 | 37.6 | 39.7 | 41.8 | 43.9 | 46.0 | 47.0 | 47.7 | 48.0 | 47.5 | 47.0 | 45L8 | 44.0 |
| −55 | 37.0 | 39.1 | 41.2 | 43.3 | 45.2 | 46.1 | 47.0 | 47.7 | 48.0 | 47.5 | 47.0 | 45.8 | 44.0 |
| −60 | 38.6 | 40.7 | 42.7 | 44.3 | 45.2 | 46.1 | 47.0 | 47.7 | 48.0 | 47.5 | 47.0 | 45.8 | 44.0 |
| −65 | 40.3 | 42.4 | 43.6 | 44.3 | 45.2 | 46.1 | 47.0 | 47.7 | 48.0 | 47.5 | 47.0 | 45.8 | 44.0 |
| −70 | 42.2 | 43.0 | 43.6 | 44.3 | 45.2 | 46.1 | 47.0 | 47.7 | 48.0 | 47.5 | 47.0 | 45.8 | 44.0 |
| −75 | 42.5 | 43.0 | 43.6 | 44.3 | 45.2 | 46.1 | 47.0 | 47.7 | 48.0 | 47.5 | 47.0 | 45.8 | 44.0 |

TABLE 3-continued

| $V_A$ | | | | | | | | | | | | | |
|---|---|---|---|---|---|---|---|---|---|---|---|---|---|
| −80 | 42.5 | 43.0 | 43.6 | 44.3 | 45.2 | 46.1 | 47.0 | 47.7 | 48.0 | 47.5 | 47.0 | 45.8 | 44.0 |

TABLE 4

Expected Torque

| $T\updownarrow \;\; \omega\leftrightarrow$ | 0 | 16 | 32 | 48 | 64 | 80 | 96 | 112 | 128 | 144 | 160 | 176 | 192 |
|---|---|---|---|---|---|---|---|---|---|---|---|---|---|
| 80 | 73.6 | 73.6 | 73.1 | 72.7 | 72.5 | 72.4 | 72.2 | 72.1 | 71.9 | 71.8 | 70.5 | 62.1 | 52.0 |
| 75 | 73.6 | 73.6 | 73.1 | 72.7 | 72.5 | 72.4 | 72.2 | 72.1 | 71.9 | 71.8 | 70.5 | 62.1 | 52.0 |
| 70 | 70.0 | 70.0 | 70.0 | 70.0 | 70.0 | 70.0 | 70.0 | 70.0 | 70.0 | 70.0 | 70.0 | 62.1 | 52.0 |
| 65 | 65.0 | 65.0 | 65.0 | 65.0 | 65.0 | 65.0 | 65.0 | 65.0 | 65.0 | 65.0 | 65.0 | 62.1 | 52.0 |
| 60 | 60.0 | 60.0 | 60.0 | 60.0 | 60.0 | 60.0 | 60.0 | 60.0 | 60.0 | 60.0 | 60.0 | 60.0 | 52.0 |
| 55 | 55.0 | 55.0 | 55.0 | 55.0 | 55.0 | 55.0 | 55.0 | 55.0 | 55.0 | 55.0 | 55.0 | 55.0 | 52.0 |
| 50 | 50.0 | 50.0 | 50.0 | 50.0 | 50.0 | 50.0 | 50.0 | 50.0 | 50.0 | 50.0 | 50.0 | 50.0 | 50.0 |
| 45 | 45.0 | 45.0 | 45.0 | 45.0 | 45.0 | 45.0 | 45.0 | 45.0 | 45.0 | 45.0 | 45.0 | 45.0 | 45.0 |
| 40 | 40.0 | 40.0 | 40.0 | 40.0 | 40.0 | 40.0 | 40.0 | 40.0 | 40.0 | 40.0 | 40.0 | 40.0 | 40.0 |
| 35 | 35.0 | 35.0 | 35.0 | 35.0 | 35.0 | 35.0 | 35.0 | 35.0 | 35.0 | 35.0 | 35.0 | 35.0 | 35.0 |
| 30 | 30.0 | 30.0 | 30.0 | 30.0 | 30.0 | 30.0 | 30.0 | 30.0 | 30.0 | 30.0 | 30.0 | 30.0 | 30.0 |
| 25 | 25.0 | 25.0 | 25.0 | 25.0 | 25.0 | 25.0 | 25.0 | 25.0 | 25.0 | 25.0 | 25.0 | 25.0 | 25.0 |
| 20 | 20.0 | 20.0 | 20.0 | 20.0 | 20.0 | 20.0 | 20.0 | 20.0 | 20.0 | 20.0 | 20.0 | 20.0 | 20.0 |
| 15 | 15.0 | 15.0 | 15.0 | 15.0 | 15.0 | 15.0 | 15.0 | 15.0 | 15.0 | 15.0 | 15.0 | 15.0 | 15.0 |
| 10 | 10.0 | 10.0 | 10.0 | 10.0 | 10.0 | 10.0 | 10.0 | 10.0 | 10.0 | 10.0 | 10.0 | 10.0 | 10.0 |
| 5 | 5.0 | 5.0 | 5.0 | 5.0 | 5.0 | 5.0 | 5.0 | 5.0 | 5.0 | 5.0 | 5.0 | 5.0 | 5.0 |
| 0 | 0 | 0 | 0 | 0 | 0 | 0 | 0 | 0 | 0 | 0 | 0 | 0 | 0 |

| $T\updownarrow \;\; \omega\leftrightarrow$ | 208 | 224 | 240 | 256 | 272 | 288 | 304 | 320 | 336 | 352 | 368 | 384 | 400 |
|---|---|---|---|---|---|---|---|---|---|---|---|---|---|
| 40 | 44.6 | 39.3 | 35.3 | 32.2 | 29.8 | 27.7 | 25.9 | 24.2 | 22.6 | 21.2 | | | |
| 37.5 | | 37.6 | 35.3 | 32.2 | 29.8 | 27.7 | 25.9 | 24.2 | 22.6 | 21.2 | | | |
| 35 | 44.6 | 35.0 | 35.0 | 32.2 | 29.8 | 27.7 | 25.9 | 24.2 | 22.6 | 21.2 | | | |
| 32.5 | | 32.5 | 32.5 | 32.2 | 29.8 | 27.7 | 25.9 | 24.2 | 22.6 | 21.2 | | | |
| 30 | 44.6 | 30.0 | 30.0 | 30.0 | 29.8 | 27.7 | 25.9 | 24.2 | 22.6 | 21.2 | | | |
| 27.5 | | 27.5 | 27.5 | 27.5 | 27.5 | 27.6 | 25.9 | 24.2 | 22.6 | 21.2 | | | |
| 25 | 44.6 | 25.0 | 25.0 | 25.0 | 25.0 | 25.0 | 25.0 | 24.2 | 22.6 | 21.2 | | | |
| 22.5 | | 22.6 | 22.6 | 22.6 | 22.6 | 22.6 | 22.6 | 22.6 | 22.6 | 21.2 | | | |
| 20 | 40.0 | 20.0 | 20.0 | 20.0 | 20.0 | 20.0 | 20.0 | 20.0 | 20.0 | 20.0 | 19.9 | 18.8 | 17.9 |
| 17.5 | | 17.6 | 17.6 | 17.6 | 17.6 | 17.6 | 17.6 | 17.6 | 17.6 | 17.6 | 17.5 | 17.5 | 17.5 |
| 15 | 30.0 | 15.0 | 15.0 | 15.0 | 15.0 | 15.0 | 15.0 | 15.0 | 15.0 | 15.0 | 15.0 | 15.0 | 15.0 |
| 12.5 | | 12.5 | 12.5 | 12.5 | 12.5 | 12.5 | 12.5 | 12.5 | 12.5 | 12.5 | 12.5 | 12.5 | 12.5 |
| 10 | 20.0 | 10.0 | 10.0 | 10.0 | 10.0 | 10.0 | 10.0 | 10.0 | 10.0 | 10.0 | 10.0 | 10.0 | 10.0 |
| 7.5 | | 7.5 | 7.5 | 7.5 | 7.5 | 7.5 | 7.5 | 7.5 | 7.5 | 7.5 | 7.5 | 7.5 | 7.5 |
| 5 | 10.0 | 6.0 | 6.0 | 6.0 | 6.0 | 6.0 | 6.0 | 6.0 | 6.0 | 6.0 | 5.0 | 5.0 | 5.0 |
| 2.5 | | 2.5 | 2.5 | 2.5 | 2.5 | 2.5 | 2.5 | 2.5 | 2.5 | 2.5 | 2.5 | 2.5 | 2.5 |
| 0 | 0.0 | 0.0 | 0.0 | 0.0 | 0.0 | 0.0 | 0.0 | 0.0 | 0.0 | 0.0 | 0.0 | 0.0 | 0.0 |

| $T\updownarrow \;\; \omega\leftrightarrow$ | 0 | 16 | 32 | 48 | 64 | 80 | 96 | 112 | 128 | 144 | 160 | 176 | 192 |
|---|---|---|---|---|---|---|---|---|---|---|---|---|---|
| −5 | −5.0 | −5.0 | −5.0 | −5.0 | −5.0 | −5.0 | −5.0 | −5.0 | −5.0 | −5.0 | −5.0 | −5.0 | −5.0 |
| −10 | −10.0 | −10.0 | −10.0 | −10.0 | −10.0 | −10.0 | −10.0 | −10.0 | −10.0 | −10.0 | −10.0 | −10.0 | −10.0 |
| −15 | −15.0 | −15.0 | −15.0 | −15.0 | −15.0 | −15.0 | −15.0 | −15.0 | −15.0 | −15.0 | −15.0 | −15.0 | −15.0 |
| −20 | −20.0 | −20.0 | −20.0 | −20.0 | −20.0 | −20.0 | −20.0 | −20.0 | −20.0 | −20.0 | −20.0 | −20.0 | −20.0 |
| −25 | −25.0 | −25.0 | −25.0 | −25.0 | −25.0 | −25.0 | −25.0 | −25.0 | −25.0 | −25.0 | −25.0 | −25.0 | −25.0 |
| −30 | −30.0 | −30.0 | −30.0 | −30.0 | −30.0 | −30.0 | −30.0 | −30.0 | −30.0 | −30.0 | −30.0 | −30.0 | −30.0 |
| −35 | −35.0 | −35.0 | −35.0 | −35.0 | −35.0 | −35.0 | −35.0 | −35.0 | −35.0 | −35.0 | −35.0 | −35.0 | −35.0 |
| −40 | −40.0 | −40.0 | −40.0 | −40.0 | −40.0 | −40.0 | −40.0 | −40.0 | −40.0 | −40.0 | −40.0 | −40.0 | −40.0 |
| −45 | −45.0 | −45.0 | −45.0 | −45.0 | −45.0 | −45.0 | −45.0 | −45.0 | −45.0 | −45.0 | −45.0 | −45.0 | −45.0 |
| −50 | −50.0 | −50.0 | −50.0 | −50.0 | −50.0 | −50.0 | −50.0 | −50.0 | −50.0 | −50.0 | −50.0 | −50.0 | −50.0 |
| −55 | −55.0 | −55.0 | −55.0 | −55.0 | −55.0 | −55.0 | −55.0 | −55.0 | −55.0 | −55.0 | −55.0 | −55.0 | −55.0 |
| −60 | −60.0 | −60.0 | −60.0 | −60.0 | −60.0 | −60.0 | −60.0 | −60.0 | −60.0 | −60.0 | −60.0 | −60.0 | −60.0 |
| −65 | −65.0 | −65.0 | −65.0 | −65.0 | −65.0 | −65.0 | −65.0 | −65.0 | −65.0 | −65.0 | −65.0 | −65.0 | −65.0 |
| −70 | −70.0 | −70.0 | −70.0 | −70.0 | −70.0 | −70.0 | −70.0 | −70.0 | −70.0 | −70.0 | −70.0 | −70.0 | −70.0 |
| −75 | −74.8 | −75.0 | −75.0 | −75.0 | −75.0 | −75.0 | −75.0 | −75.0 | −75.0 | −75.0 | −75.0 | −75.0 | −75.0 |
| −80 | −75.0 | −76.5 | −77.0 | −77.4 | −77.6 | −77.8 | −78.0 | −78.1 | −78.3 | −78.4 | −78.5 | −78.7 | −75.0 |

| $T\updownarrow \;\; \omega\leftrightarrow$ | 208 | 224 | 240 | 256 | 272 | 288 | 304 | 320 | 336 | 352 | 368 | 384 | 400 |
|---|---|---|---|---|---|---|---|---|---|---|---|---|---|
| −5 | −5.0 | −5.0 | −5.0 | −5.0 | −5.0 | −5.0 | −5.0 | −5.0 | −5.0 | −5.0 | −5.0 | −5.0 | −5.0 |
| −10 | −10.0 | −10.0 | −10.0 | −10.0 | −10.0 | −10.0 | −10.0 | −10.0 | −10.0 | −10.0 | −10.0 | −10.0 | −10.0 |
| −15 | −15.0 | −15.0 | −15.0 | −15.0 | −15.0 | −15.0 | −15.0 | −15.0 | −15.0 | −15.0 | −15.0 | −15.0 | −15.0 |
| −20 | −20.0 | −20.0 | −20.0 | −20.0 | −20.0 | −20.0 | −20.0 | −20.0 | −20.0 | −20.0 | −20.0 | −20.0 | −20.0 |
| −25 | −25.0 | −25.0 | −25.0 | −25.0 | −25.0 | −25.0 | −25.0 | −25.0 | −25.0 | −25.0 | −25.0 | −25.0 | −21.2 |
| −30 | −30.0 | −30.0 | −30.0 | −30.0 | −30.0 | −30.0 | −30.0 | −30.0 | −30.0 | −30.0 | −29.4 | −25.3 | −21.2 |
| −35 | −35.0 | −35.0 | −35.0 | −35.0 | −35.0 | −35.0 | −35.0 | −35.0 | −35.0 | −33.6 | −29.4 | −25.3 | −21.2 |

TABLE 4-continued

| | Expected Torque | | | | | | | | | | | |
|---|---|---|---|---|---|---|---|---|---|---|---|---|
| −40 | −40.0 | −40.0 | −40.0 | −40.0 | −40.0 | −40.0 | −40.0 | −40.0 | −37.7 | −33.6 | −29.4 | −25.3 | −21.2 |
| −45 | −45.0 | −45.0 | −45.0 | −45.0 | −45.0 | −45.0 | −45.0 | −41.9 | −37.7 | −33.6 | −29.4 | −25.3 | −21.2 |
| −50 | −50.0 | −50.0 | −50.0 | −50.0 | −50.0 | −50.0 | −46.0 | −41.9 | −37.7 | −33.6 | −29.4 | −25.3 | −21.2 |
| −55 | −55.0 | −55.0 | −55.0 | −55.0 | −54.3 | −50.2 | −46.0 | −41.9 | −37.7 | −33.6 | −29.4 | −25.3 | −21.2 |
| −60 | −60.0 | −60.0 | −60.0 | −58.4 | −54.3 | −50.2 | −46.0 | −41.9 | −37.7 | −33.6 | −29.4 | −25.3 | −21.2 |
| −65 | −65.0 | −65.0 | −62.6 | −58.4 | −54.3 | −50.2 | −46.0 | −41.9 | −37.7 | −33.6 | −29.4 | −25.3 | −21.2 |
| −70 | −70.0 | −66.7 | −62.6 | −58.4 | −54.3 | −50.2 | −46.0 | −41.9 | −37.7 | −33.6 | −29.4 | −25.3 | −21.2 |
| −75 | −70.9 | −66.7 | −62.6 | −58.4 | −54.3 | −50.2 | −46.0 | −41.9 | −37.7 | −33.6 | −29.4 | −25.3 | −21.2 |
| −80 | −70.9 | −66.7 | −62.6 | −58.4 | −54.3 | −50.2 | −46.0 | −41.9 | −37.7 | −33.6 | −29.4 | −25.3 | −21.2 |

It is contemplated by the present invention that, through a conventional interpolation process, the above tables may be expanded to include more values corresponding to more frequent torque and speed intervals.

Within the motor control circuit 20 are closed loop control circuits for maintaining both the armature and the field current at desired values, namely, armature current control circuit 80 and field current control circuit 82, see FIGS. 1 and 3. The outputs from these circuits are connected to the armature assembly 12 and the field assembly 14 of the motor 10. These circuits receive feedback inputs from current sensors associated with the motor control circuits 80, 82.

The armature current and adjusted field current setpoint values on the lines 40 and 42 are applied to closed-loop control circuits 80 and 82 after being converted to analog form by digital-to-analog converters 83 and 84, see FIGS. 2 and 3. The two control circuits 80 and 82 include current delivery circuits including a bridge logic arrangement which apply switching signals to an arrangement of MOSFET devices that separately regulate the flow of current from a battery 90 to the field and armature coils F and A, respectively. The current delivery circuits of the control circuits 80 and 82 include current sensors 96 and 97 which generate feedback signals, $I_a$ feedback 93 and $I_f$ feedback 94, respectively, proportional to the respective measured currents. These feedback signals are applied to a pair of comparators 85 and 86 for comparison with corresponding setpoint values. The comparators 85 and 86 then generate an armature current error signal and a field current error signal, respectively.

A pair of amplifiers 87, 88 multiply the field current error signal and the armature current error signal by gain factors $K_2$ and $K_3$, respectively. These circuits cause a pair of pulse width modulated (PWM) drives to supply battery current to the motor coils in pulses of constant amplitude and frequency. The amplitude of the pulses varies as a function of the state of charge of the associated battery. The duty cycles of the pulses correspond to the respective setpoint values. This effectively sets the average field current and the average armature current so as to develop the desired torque in the armature.

It should be appreciated that the armature voltage, as represented by the output of the comparator 72, will reflect flux losses. If there has been an unexpected loss of field flux, the torque generated by the motor will decrease. There will also be a concomitant decrease in the back EMF opposing the armature current driver, so the armature driver generates less average voltage to supply the demand for armature current. Therefore, in the present invention, actual armature voltage is compared to a desired armature voltage at a given torque and speed and is used to adjust the nominal field current value to achieve the desired actual torque.

Having described the invention in detail and by reference to preferred embodiments thereof, it will be apparent that modifications and variations are possible without departing from the scope of the invention defined in the appended claims.

What is claimed is:

1. A motor control system comprising:
    an electrically charged battery characterized by an operating battery voltage;
    an electrical motor coupled to said battery, said electrical motor including
        an armature assembly responsive to an armature current, wherein a magnitude of said armature current is a function of a predetermined armature current setpoint signal $I_{a\_SET}$ and
        a field assembly responsive to a field current, wherein a magnitude of said field current is a function of a predetermined field current setpoint signal $I_{f\_SET}$ and a field current de-boost signal $I_{f\_DE-BOOST}$;
    a battery voltage sensor arranged to generate an operating battery voltage signal $V_{BAT}$ from said operating battery voltage;
    an armature voltage sensor arranged to generate a measured armature voltage signal $V_a$ from an electrical potential of said armature assembly;
    an armature current sensor arranged to generate a measured armature current signal $I_a$ indicative of an amount of current flowing through said armature assembly;
    a microprocessor programmed to
        generate the armature current setpoint signal $I_{a\_SET}$ and the field current setpoint signal $I_{f\_SET}$,
        generate an armature-to-field current check function, wherein said check function defines a set of armature current to field current ratio values $(I_a/I_f)_{CHECK}$ as a function of armature current,
        calculate a ratio of said measured armature current signal $I_a$ to said field current setpoint signal $I_{f\_SET}$ to establish an operating ratio value $I_a/I_{f\_SET}$,
        compare said operating ratio value $I_a/I_{f\_SET}$ to a corresponding armature current to field current ratio value $(I_a/I_f)_{CHECK}$ of said armature-to-field current check function, and
        establish said field current de-boost signal $I_{f\_DE-BOOST}$, wherein the magnitude of said field current de-boost signal $I_{f\_DE-BOOST}$ is a function of said measured armature current signal $I_a$ and said comparison of said operating ratio value $I_a/I_{f\_SET}$ to said corresponding ratio value $(I_a/I_f)_{CHECK}$.

2. A motor control system as claimed in claim 1 wherein said microprocessor is programmed to compare said operating ratio value $I_a/I_{f\_SET}$ to said corresponding armature current to field current ratio value $(I_a/I_f)_{CHECK}$ by determining whether said operating ratio value $I_a/I_{f\_SET}$ is greater than said corresponding ratio value $(I_a/I_f)_{CHECK}$.

3. A motor control system as claimed in claim 1 wherein said microprocessor is programmed to establish the magnitude of said field current de-boost signal $I_{f\_DE-BOOST}$ according to a selected one of two distinct de-boost equations, and wherein the identity of the selected equation depends upon the outcome of the comparison of said operating ratio value $I_a/I_{f\_SET}$ to the corresponding armature current to field current ratio value $(I_a/I_f)_{CHECK}$.

4. A motor control system as claimed in claim 3 wherein said two distinct de-boost equations are as follows:

$$I'_{f\_SET} = \frac{I_a}{(I_a/I_f)_{CHECK}} \quad \text{equation (3)}$$

$$I'_{f\_SET} = I_{f\_SET} - [(I_{a\_ERROR}) \times I_{f\_GAIN}] \quad \text{equation (4)}$$

where $I_{f\_SET}'$ represents a de-boosted field current setpoint signal, where $I_{f\_GAIN}$ represents a preselected gain parameter, and wherein said microprocessor is further programmed to generate an armature current error signal $I_{a\_ERROR}$ by comparing said armature current setpoint signal $I_{a\_SET}$ and said measured armature current signal $I_a$.

5. A motor control system as claimed in claim 4 wherein said microprocessor is programmed to select equation (3) when said operating ratio value $I_a/I_{f\_SET}$ is greater than the corresponding armature current to field current ratio value $(I_a/I_f)_{CHECK}$.

6. A motor control system as claimed in claim 4 wherein said microprocessor is programmed to select equation (4) when said operating ratio value $I_a/I_{f\_SET}$ is not greater than the corresponding armature current to field current ratio value $(I_a/I_f)_{CHECK}$.

7. A motor control system as claimed in claim 1 wherein said electrical motor is characterized by a set of commutation limits, and wherein said microprocessor is programmed to generate said armature-to-field current check function such that said check function simulates said commutation limits as a function of armature current.

8. A motor control system as claimed in claim 1 wherein said electrical motor is characterized by a set of commutation limits, and wherein said armature-to-field current check function is defined by the following equations:

$$(I_a/I_f)_{CHECK} = (I_a/I_f)_{MAX} + (I_a/I_f)_{GAIN} - (I_a/I_f)_{SLOPE} \quad \text{equation (1)}$$

$$(I_a/I_f)_{CHECK} = (I_a/I_f)_{MIN} + (I_a/I_f)_{GAIN} \quad \text{equation (2)}$$

where $(I_a/I_f)_{MAX}$ represents a maximum armature current to field current ratio within said commutation limits, $(I_a/I_f)_{MIN}$ represents a minimum armature current to field current ratio within said commutation limits, $(I_a/I_f)_{GAIN}$ represents the following product $$G_{DE\_BOOST} \times (V_{REF} - V_{BAT})$$

where $G_{DE\_BOOST}$ is a predetermined gain parameter, $V_{REF}$ represents a reference battery voltage, and $(I_a/I_f)_{SLOPE}$ represents the following product $$I_a \times m_{DE\_BOOST}$$

where $m_{DE\_BOOST}$ is a predetermined slope parameter.

9. A motor control system as claimed in claim 8 wherein said predetermined gain parameter $G_{DE-BOOST}$ represents an allowable increase in armature to field current ratio per battery volts.

10. A motor control system as claimed in claim 8 wherein said predetermined slope parameter represents a maximum ratio of armature to field current per amp of armature current.

11. A motor control system as claimed in claim 8 wherein said microprocessor is programmed to generate said armature to field current check function such that said check function is defined by equation (1) when $$(I_a/I_f)_{CHECK} > [(I_a/I_f)_{MIN} + (I_a/I_f)_{GAIN}]$$

12. A motor control system as claimed in claim 8 wherein said microprocessor is programmed to generate said armature to field current check function such that said check function is defined by equation (2) when $$(I_a/I_f)_{CHECK} > [(I_a/I_f)_{MIN} + (I_a/I_f)_{GAIN}]$$

13. A motor control system as claimed in claim 1 wherein said microprocessor is further programmed to generate a full-on indication signal when said measured armature voltage signal $V_a$ is substantially equal to said operating battery voltage signal $V_{BAT}$, generate an armature current error signal $I_{a\_ERROR}$ by comparing said armature current setpoint signal $I_{a\_SET}$ and said measured armature current signal $I_a$, generate a low armature current indication signal when said armature current error signal $I_{a\_ERROR}$ exceeds a predetermined value, and enable said field current de-boost signal establishing step according to whether said full-on indication signal and said low armature current indication signal are generated.

14. A motor control system as claimed in claim 13 wherein said microprocessor is further programmed to generate said armature current error signal according to the following equation $$I_{a\_ERREOR} = I_a - I_{a\_SET}.$$

15. A motor control system as claimed in claim 13 wherein said microprocessor is programmed to generate said full-on indication signal when $$V_a > V_{BAT} - V_{BAT\_TOLERANCE}$$

where $V_{BAT\_TOLERANCE}$ is a predetermined voltage tolerance.

16. A motor control system as claimed in claim 13 wherein said microprocessor is programmed to generate said low armature current indication signal when $$I_a < I_{a\_SET} - I_{a\_TOLERANCE}$$

where $I_{a\_TOLERANCE}$ is a predetermined current tolerance.

17. A motor control system as claimed in claim 1 wherein:

said field assembly is further responsive to a field current correction signal $I_{f\_CORRECTION}$;

said motor control system further comprises a motor speed sensor arranged to generate an actual motor speed signal ω representative of an actual speed of said electrical motor; and said microprocessor is further programmed to generate an armature voltage reference signal $V_{a\_REF}$, compare said armature voltage reference signal $V_{a\_REF}$ to said measured armature voltage signal $V_a$ and generate an armature voltage error signal $V_{a\_ERROR}$ based on said comparison, and generate said field current correction signal $I_{f\_CORRECTION}$ as a function of said armature voltage error signal.

18. A motor control system comprising:

an electrically charged battery characterized by an operating battery voltage;

an electrical motor coupled to said battery, said electrical motor including an armature assembly responsive to an armature current, wherein a magnitude of said armature current is a function of a predetermined armature current setpoint signal $I_{a\_hd\ SET}$ and a field assembly responsive to a field current, wherein a magnitude of said field current is a function of a predetermined field current setpoint signal $I_{f\_SET}$, a field current correction signal $I_{f\_CORRECTION}$, and a field current de-boost signal $I_{f\_DE-BOOST}$;

a battery voltage sensor arranged to generate an operating battery voltage signal $V_{BAT}$ from said operating battery voltage;

a motor speed sensor arranged to generate an actual motor speed signal $\omega$ representative of an actual speed of said electrical motor;

an armature voltage sensor arranged to generate a measured armature voltage signal $V_a$ from an electrical potential of said armature assembly;

an armature current sensor arranged to generate a measured armature current signal $I_a$ indicative of an amount of current flowing through said armature assembly;

a microprocessor programmed to generate an armature current setpoint signal $I_{a\_SET}$, a field current setpoint signal $I_{f\_SET}$, and an armature voltage reference signal $V_{a\_REF}$, compare said armature voltage reference signal $V_{a\_REF}$ to said measured armature voltage signal $V_a$ and generate an armature voltage error signal $V_{a\_ERROR}$ based on said comparison, generate said field current correction signal $I_{f\_CORRECTION}$ as a function of said armature voltage error signal, generate an armature-to-field current check function, wherein said check function defines a set of armature current to field current ratio values $(I_a/I_f)_{CHECK}$ as a function of armature current, calculate a ratio of said measured armature current signal $I_a$ to said field current setpoint signal $I_{f\_SET}$ to establish an operating ratio value $I_a/I_{f\_SET}$, compare said operating ratio value $I_a/I_{f\_SET}$ to a corresponding armature current to field current ratio value $(I_a/I_f)_{CHECK}$ of said armature-to-field current check function, and establish said field current de-boost signal $I_{f\_DE-BOOST}$, wherein the magnitude of said field current de-boost signal $I_{f\_DE-BOOST}$ is a function of said measured armature current signal $I_a$ and said comparison of said operating ratio value $I_a/I_{f\_SET}$ to said corresponding ratio value $(I_a/I_f)_{CHECK}$.

19. A motor control system as claimed in claim 18 wherein said microprocessor is further programmed to generate said field current correction signal $I_{f\_CORRECTION}$ such that it is inversely proportional to said actual motor speed signal $\omega$.

20. A motor control system as claimed in claim 18 wherein said microprocessor is further programmed to generate said field current correction signal $I_{fCORRECTION}$ as a function of said armature voltage error signal $V_{a\_ERROR}$ and said actual motor speed signal $\omega$.

21. A motor control system as claimed in claim 20 wherein said microprocessor is further programmed to generate said field current correction signal $I_{f\_CORRECTION}$ according to the following equation:

$$I_{f\_CORRECTION} = V_{a\_ERROR} \times C_1 \times (G_v/\omega)$$

where $V_{a\_ERROR}$ is the armature voltage error signal, $C_1$ is a constant, $G_v$ is a variable gain parameter, and $\omega$ is the actual speed of the motor.

22. A motor control system as claimed in claim 21 wherein said electrical motor includes a characteristic air gap between poles of said field assembly and an armature core of said armature assembly, and wherein said constant $C_1$ includes a motor constant K, unit scaling corrections, and a coefficient for $dI_{f\_SET}/dB$ where $I_{f\_SET}$ is the field current setpoint and B represents the magnetic flux in said air gap of said electrical motor.

23. A motor control system as claimed in claim 18 wherein said armature assembly includes high and low voltage nodes, and wherein said armature voltage sensor is arranged to measure armature voltage at said low voltage node.

24. A motor control system as claimed in claim 18 wherein said microprocessor is further programmed to modify said measured armature voltage signal $V_a$ by summing said measured armature voltage signal $V_a$ and said operating battery voltage signal $V_{BAT}$ prior to comparing said measured armature voltage signal $V_a$ to said armature voltage reference signal $V_{a\_REF}$.

25. A motor control system as claimed in claim 18 wherein:

said motor control system further comprises a speed command generator arranged to generate a speed command signal S indicative of a desired speed of said electrical motor; and said microprocessor is further programmed to generate said armature voltage reference signal $V_{a\_REF}$, said field current setpoint $I_{f\_SET}$, and said armature current setpoint $I_{a\_SET}$ as a function of said speed command signal S and said actual motor speed signal $\omega$.

26. A motor control system as claimed in claim 25 wherein said microprocessor is programmed to generate said armature voltage reference signal $V_{a\_REF}$, said field current setpoint $I_{f\_SET}$, and said armature current setpoint $I_{a\_SET}$ from a look-up table having at least one input value derived from said speed command signal S and said actual motor speed signal $\omega$.

27. A motor control system as claimed in claim 25 wherein said microprocessor is programmed to generate said armature voltage reference signal, said field current setpoint, and said armature current setpoint from a look-up table.

28. A motor control system as claimed in claim 25 wherein said microprocessor is programmed to generate said armature voltage reference signal $V_{a\_REF}$, said field current setpoint $I_{f\_SET}$, and said armature current setpoint $I_{a\_SET}$ from a dual-input look-up table, wherein a first input of said look-up table comprises a torque setpoint signal $T_{SET}$, and wherein a second input of said look-up table comprises said actual motor speed signal $\omega$.

29. A motor control system as claimed in claim 28 wherein said microprocessor is programmed to generate said torque setpoint signal $T_{SET}$ as a function of said actual motor speed signal $\omega$ and said speed command signal S.

* * * * *

UNITED STATES PATENT AND TRADEMARK OFFICE
CERTIFICATE OF CORRECTION

PATENT NO.    : 6,031,965
DATED         : February 29, 2000
INVENTOR(S)   : Joseph K. Hammer et al.

It is certified that error appears in the above-identified patent and that said Letters Patent is hereby corrected as shown below:

Column 3,
Lines 31-34, $I'_{f\_SET}$ should be -- $I'_{f\_SET}$ --
Line 38, $I_{f\_SET}$ should be -- $I'_{f\_SET}$ --

Column 12,
Line 1, in equation (1) $=(I_d/I_f)+$ should be -- $=(I_d/I_f)_{MAX}+$ --
Line 55, in equation (3) $I'_f$ should be $I'_f$
Line 57, in equation (3) $I'_f$ should be $I'_f$
Line 60, $I_{f\_SET}$ should be -- $I'_{f\_SET}$ --

Column 13,
Line 9, $I_{f\_SET}$ should be -- $I'_{f\_SET}$ --
Line 11, $I'_{f\_SET}$, then $I_{f\_SET}$ should be -- $I'_{f\_SET}$ --, then $I'_{f\_SET}$ Column 24, claim 1,
Line 44, "the" should be "a"

Column 25, claim 4,
Line 12/13, in equation (3), $I'_{f\_SET}$ should be -- $I'_{f\_SET}$ --
Line 14/15, in equation (4), $I'_{f\_SET}$ should be -- $I'_{f\_SET}$ --
Line 17, $I_{f\_SET}$ should be -- $I_{f SET}$ --

Column 26, claim 12,
Line 6, > should be -- < --

Column 26, claim 16,
Line 47, delete "signal"

Column 27, claim 18,
Line 9, $I_{a\text{-}hd\ SET}$ should be -- $I_{a\_SET}$ --

UNITED STATES PATENT AND TRADEMARK OFFICE
CERTIFICATE OF CORRECTION

PATENT NO. : 6,031,965
DATED : February 29, 2000
INVENTOR(S) : Joseph K. Hammer et al.

It is certified that error appears in the above-identified patent and that said Letters Patent is hereby corrected as shown below:

Column 27, claim 20,
Line 63, $I_{j\text{CORRECTION}}$ should be -- $I_{f\_\text{CORRECTION}}$ --

Signed and Sealed this

Fourth Day of December, 2001

Attest:

NICHOLAS P. GODICI
*Attesting Officer*   *Acting Director of the United States Patent and Trademark Office*